United States Patent
Lee et al.

(10) Patent No.: US 11,824,665 B2
(45) Date of Patent: Nov. 21, 2023

(54) SIDELINK HARQ FEEDBACK OF NR V2X

(71) Applicant: LG Electronics Inc., Seoul (KR)

(72) Inventors: Jongyoul Lee, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 17/421,685

(22) PCT Filed: Jan. 10, 2020

(86) PCT No.: PCT/KR2020/000468
§ 371 (c)(1),
(2) Date: Jul. 8, 2021

(87) PCT Pub. No.: WO2020/145721
PCT Pub. Date: Jul. 16, 2020

(65) Prior Publication Data
US 2022/0103309 A1    Mar. 31, 2022

(30) Foreign Application Priority Data
Jan. 11, 2019 (KR) .................. 10-2019-0004241

(51) Int. Cl.
*H04L 1/1867* (2023.01)
*H04W 4/40* (2018.01)

(52) U.S. Cl.
CPC .......... *H04L 1/1887* (2013.01); *H04W 4/40* (2018.02)

(58) Field of Classification Search
CPC ... H04L 1/1887; H04L 1/1854; H04L 1/1825; H04L 5/00; H04L 1/00; H04W 4/40; H04W 72/12
See application file for complete search history.

(56) References Cited

U.S. PATENT DOCUMENTS

| | | |
|---|---|---|
| 2018/0255544 A1 | 9/2018 | Xiao |
| 2019/0305838 A1* | 10/2019 | Davydov ............. H04B 7/0695 |

(Continued)

FOREIGN PATENT DOCUMENTS

KR    10-2018-0138556    12/2018

OTHER PUBLICATIONS

3GPP TSG RAN WG1 Meeting #95, MediaTek Inc—Discussion on physical layer procedure R1-1812365, Spokane, USA, Nov. 12-16, 2018 (Year: 2018).*

(Continued)

*Primary Examiner* — Edan Orgad
*Assistant Examiner* — Malick A Sohrab
(74) *Attorney, Agent, or Firm* — Fish & Richardson P.C.

(57) ABSTRACT

One embodiment of the present disclosure provides a method for a first device to transmit SL HARQ feedback information. The method comprises the steps of: receiving a PSSCH from a second device; determining a resource related to a PSFCH on the basis of a resource related to the PSSCH; determining an SL HARQ feedback option on the basis of link quality between the first device and the second device; and transmitting SL HARQ feedback information on the PSSCH to the second device through the resource related to the PSFCH, on the basis of whether or not decoding for a transmission block received through the PSSCH is successful and the SL HARQ feedback option, wherein the SL HARQ feedback option is determined as any one from among a first SL HARQ feedback option and a second SL HARQ feedback option.

3 Claims, 22 Drawing Sheets

(56) References Cited

U.S. PATENT DOCUMENTS

2020/0205165 A1* 6/2020 Huang .................. H04L 1/1854
2022/0060286 A1* 2/2022 Yoshioka .............. H04L 1/1854
2022/0078805 A1* 3/2022 Yoshioka .............. H04L 1/1887

OTHER PUBLICATIONS

Kyocera, "A Reliable Groupcast HARQ feedback scheme for NR V2X," R1-1900084, Presented at 3GPP TSG-RAN WG1-AH-1901, Taipei, Taiwan, Jan. 21-25, 2019, 3 pages.
MediaTek Inc., "Discussion on physical layer procedure," R1-1812365, Presented at 3GPP TSG RAN WG1 Meeting #95, Spokane, USA, Nov. 12-16, 2018, 6 pages.
Qualcomm Incorporated., "Physical layer procedures for HARQ operation for groupcast and unicast Transmissions," R1-1813422, Presented at 3GPP TSG RAN WG1 Meeting #95, Spokane, USA, Nov. 12-16, 2018, 8 pages.

* cited by examiner

FIG. 4
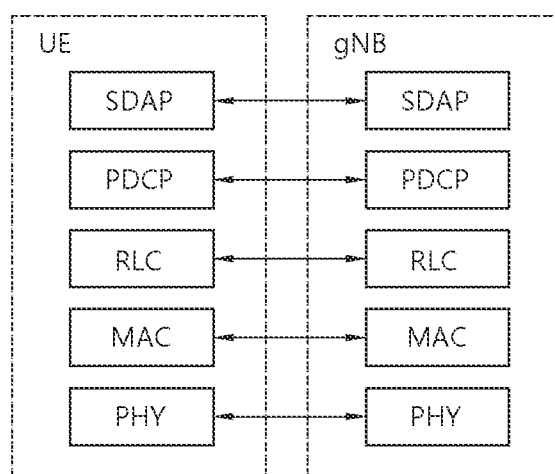
(a)
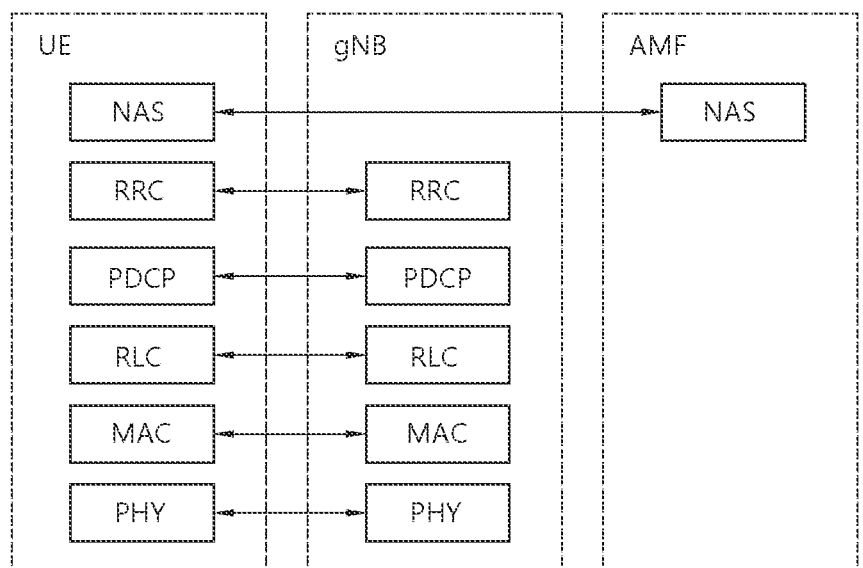
(b)

FIG. 8
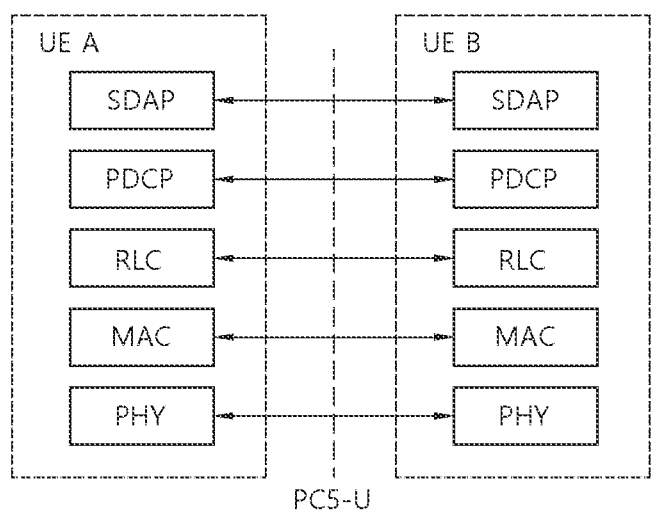
(a)
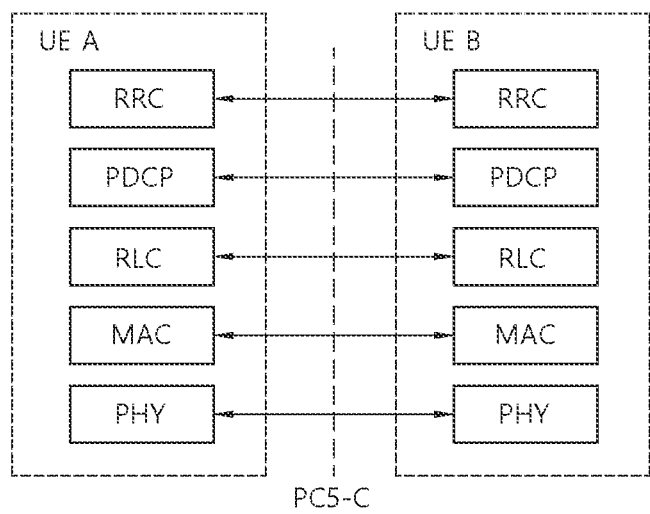
(b)

SIDELINK HARQ FEEDBACK OF NR V2X

CROSS-REFERENCE TO RELATED APPLICATIONS

This application is a National Stage application under 35 U.S.C. § 371 of International Application No. PCT/KR2020/000468, filed on Jan. 10, 2020, which claims the benefit of Korean Patent Application No. 10-2019-0004241, filed on Jan. 11, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

A technical problem of the present disclosure is to provide a method for communication between apparatuses (or terminals) based on V2X communication, and the apparatuses (or terminals) performing the method.

Another technical problem of the present disclosure is to provide a SL HARQ (Hybrid Automatic Repeat Request) method between devices based on V2X communication in a wireless communication system and an apparatus for performing the same.

Another technical problem of the present disclosure is to solve the problem of not knowing, by a transmitting device (or transmitting terminal), whether discontinuous transmission (DTX) is occurred in a receiving device (or receiving terminal) in a groupcast scenario of NR V2X where NACK only HARQ feedback that performs SL HARQ feedback based on only HARQ-NACK among HARQ-ACK and HARQ-NACK is performed.

Another technical problem of the present disclosure is to provide a method and apparatus for determining an SL HARQ feedback option based on link quality between a transmitting device and a receiving device.

According to an embodiment of the present disclosure, a method for transmitting sidelink hybrid automatic repeat request (SL HARQ) feedback information by a first apparatus may be provided. The method may include receiving a physical sidelink shared channel (PSSCH) from a second apparatus, determining a resource related to a physical sidelink feedback channel (PSFCH) based on a resource related to the PSSCH, determining an SL HARQ feedback option based on link quality between the first apparatus and the second apparatus and transmitting SL HARQ feedback information for the PSSCH through the resource related to the PSFCH based on whether decoding of a transport block received through the PSSCH succeeds and the SL HARQ feedback option, wherein the SL HARQ feedback option is determined to one of a first SL HARQ feedback option or a second SL HARQ feedback option.

According to an embodiment of the present disclosure, a first apparatus transmitting sidelink hybrid automatic repeat request (SL HARQ) feedback information may be provided. The first apparatus may include at least one memory storing instructions, at least one transceiver and at least one processor connecting the at least one memory and the at least one transceiver, wherein the at least one processor is configured to: control the at least one transceiver to receive a physical sidelink shared channel (PSSCH) from a second apparatus, determine a resource related to a physical sidelink feedback channel (PSFCH) based on a resource related to the PSSCH, determine an SL HARQ feedback option based on link quality between the first apparatus and the second apparatus, and control the at least one transceiver to transmit SL HARQ feedback information for the PSSCH to the second apparatus through a resource related to the PSFCH based on whether decoding of a transport block received through the PSSCH succeeds and the SL HARQ feedback option, wherein the SL HARQ feedback option is determined to one of a first SL HARQ feedback option or a second SL HARQ feedback option.

According to an embodiment of the present disclosure, an apparatus (or chip(set)) controlling a first terminal may be provided. The apparatus includes at least one processor and at least one computer memory operably connected by the at least one processor and storing instructions, wherein, by the at least one processor executing the instructions, the first terminal is configured to: receive a physical sidelink shared channel (PSSCH) from a second apparatus, determine a resource related to a physical sidelink feedback channel (PSFCH) based on a resource related to the PSSCH, determine an SL HARQ feedback option based on link quality between the first apparatus and the second apparatus, and transmit SL HARQ feedback information for the PSSCH to the second apparatus through a resource related to the PSFCH based on whether decoding of a transport block received through the PSSCH succeeds and the SL HARQ feedback option, wherein the SL HARQ feedback option is determined to one of a first SL HARQ feedback option or a second SL HARQ feedback option.

According to an embodiment of the present disclosure, a non-transitory computer-readable storage medium having instructions stored thereon may be provided. Based on the instructions being executed by at least one processor: the first apparatus receives a physical sidelink shared channel (PSSCH) from a second apparatus, the first apparatus determines a resource related to a physical sidelink feedback channel (PSFCH) based on a resource related to the PSSCH, the first apparatus determines an SL HARQ feedback option based on link quality between the first apparatus and the second apparatus, and the first apparatus transmits SL HARQ feedback information for the PSSCH to the second apparatus through a resource related to the PSFCH based on whether decoding of a transport block received through the PSSCH succeeds and the SL HARQ feedback option, wherein the SL HARQ feedback option is determined to one of a first SL HARQ feedback option or a second SL HARQ feedback option.

According to an embodiment of the present disclosure, a method for receiving sidelink hybrid automatic repeat request (SL HARQ) feedback information by a second apparatus may be provided. The method may include transmitting a physical sidelink shared channel (PSSCH) to a first apparatus and receiving SL HARQ feedback information for the PSSCH from the first apparatus, wherein the SL HARQ feedback information is determined based on whether decoding of a transport block transmitted to the first apparatus through the PSSCH succeeds in the first apparatus and the SL HARQ feedback option, and wherein the SL HARQ feedback option is determined to one of a first SL HARQ feedback option or a second SL HARQ feedback option based on link quality between the first apparatus and the second apparatus.

According to an embodiment of the present disclosure, a second apparatus receiving sidelink hybrid automatic repeat request (SL HARQ) feedback information may be provided. The second apparatus includes at least one memory storing instructions, at least one transceiver and at least one processor connecting the at least one memory and the at least one transceiver, wherein the at least one processor is configured to: control the at least one transceiver to transmit a physical sidelink shared channel (PSSCH) to a first apparatus, and control the at least one transceiver to receive SL HARQ feedback information for the PSSCH from the first apparatus, wherein the SL HARQ feedback information is determined based on whether decoding of a transport block transmitted to the first apparatus through the PSSCH succeeds in the first apparatus and the SL HARQ feedback option, and wherein the SL HARQ feedback option is determined to one of a first SL HARQ feedback option or a second SL HARQ feedback option based on link quality between the first apparatus and the second apparatus.

According to the present disclosure, a terminal (or an apparatus) may perform SL communication effectively.

According to the present disclosure, V2X communication between apparatuses (or terminals) may be performed effectively.

According to the present disclosure, SL HARQ (Hybrid Automatic Repeat Request) between apparatuses based on V2X communication in a wireless communication system may be performed effectively.

According to the present disclosure, the problem of not knowing, by a transmitting device (or transmitting terminal), whether discontinuous transmission (DTX) is occurred in a receiving device (or receiving terminal) in a groupcast scenario of NR V2X where NACK only HARQ feedback that performs SL HARQ feedback based on only HARQ-NACK among HARQ-ACK and HARQ-NACK is performed may be solve.

According to the present disclosure, the SL HARQ feedback option may be determined based on link quality between the transmitting device and the receiving device.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

BEST MODE FOR CARRYING OUT THE DISCLOSURE

Figure 1:
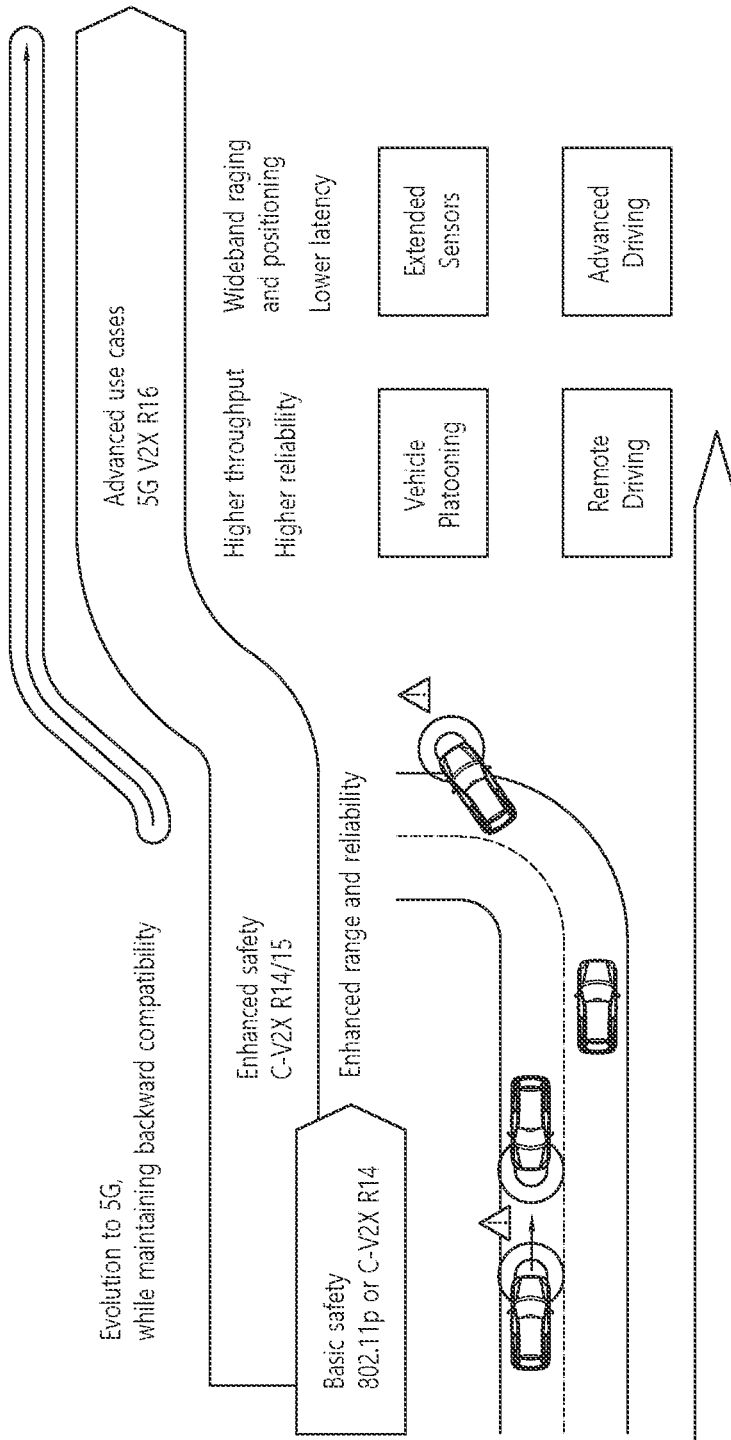
FIG. 1 is a drawing for describing V2X communication based on NR, compared to V2X communication based on RAT used before NR.

According to an embodiment of the present disclosure, a method for transmitting sidelink hybrid automatic repeat request (SL HARQ) feedback information by a first apparatus may be provided. The method may include receiving a physical sidelink shared channel (PSSCH) from a second apparatus, determining a resource related to a physical sidelink feedback channel (PSFCH) based on a resource related to the PSSCH, determining an SL HARQ feedback option based on link quality between the first apparatus and the second apparatus and transmitting SL HARQ feedback information for the PSSCH through the resource related to the PSFCH based on whether decoding of a transport block received through the PSSCH succeeds and the SL HARQ feedback option, wherein the SL HARQ feedback option is determined to one of a first SL HARQ feedback option or a second SL HARQ feedback option.

DESCRIPTION OF EXEMPLARY EMBODIMENTS

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
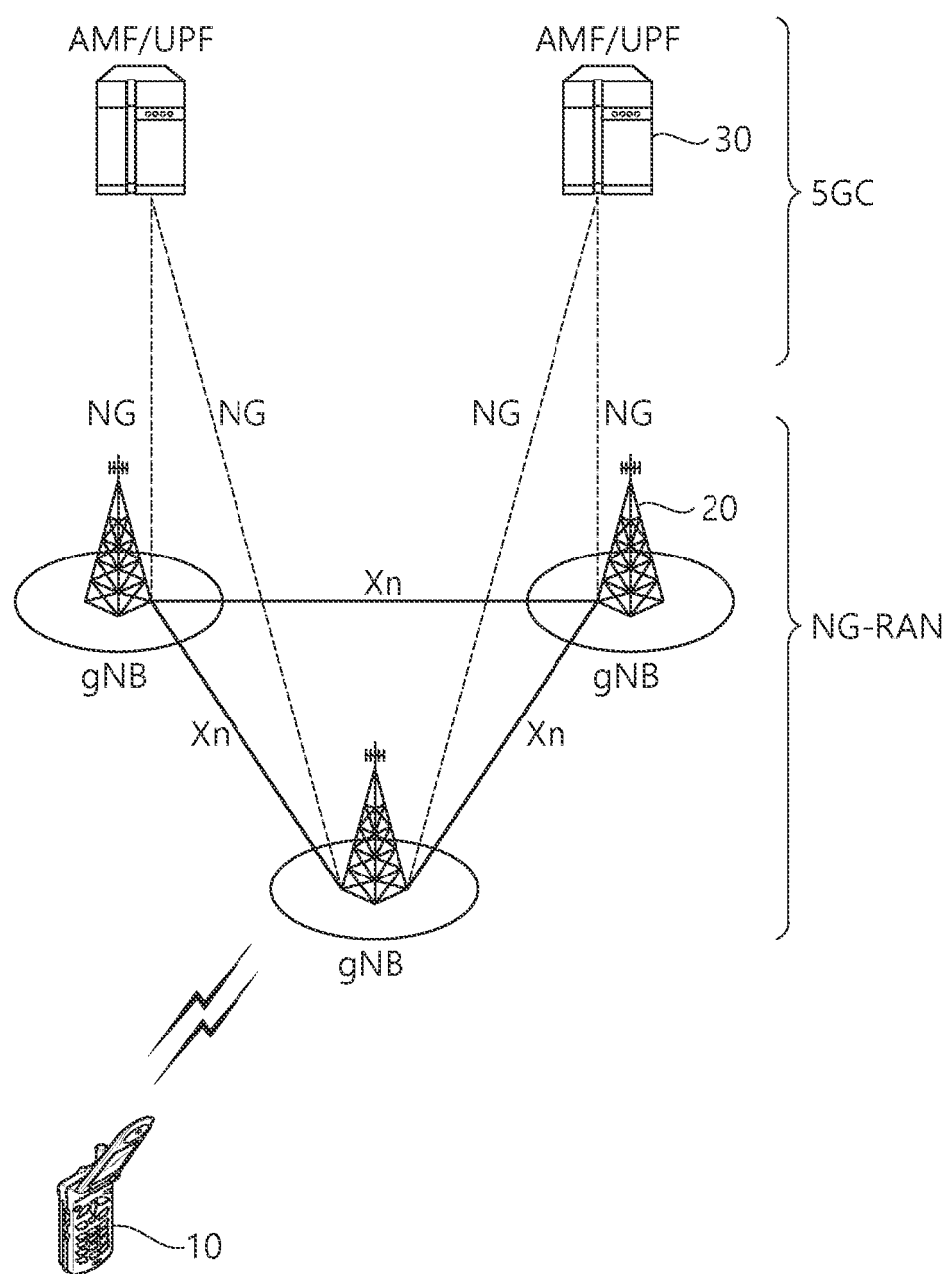
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
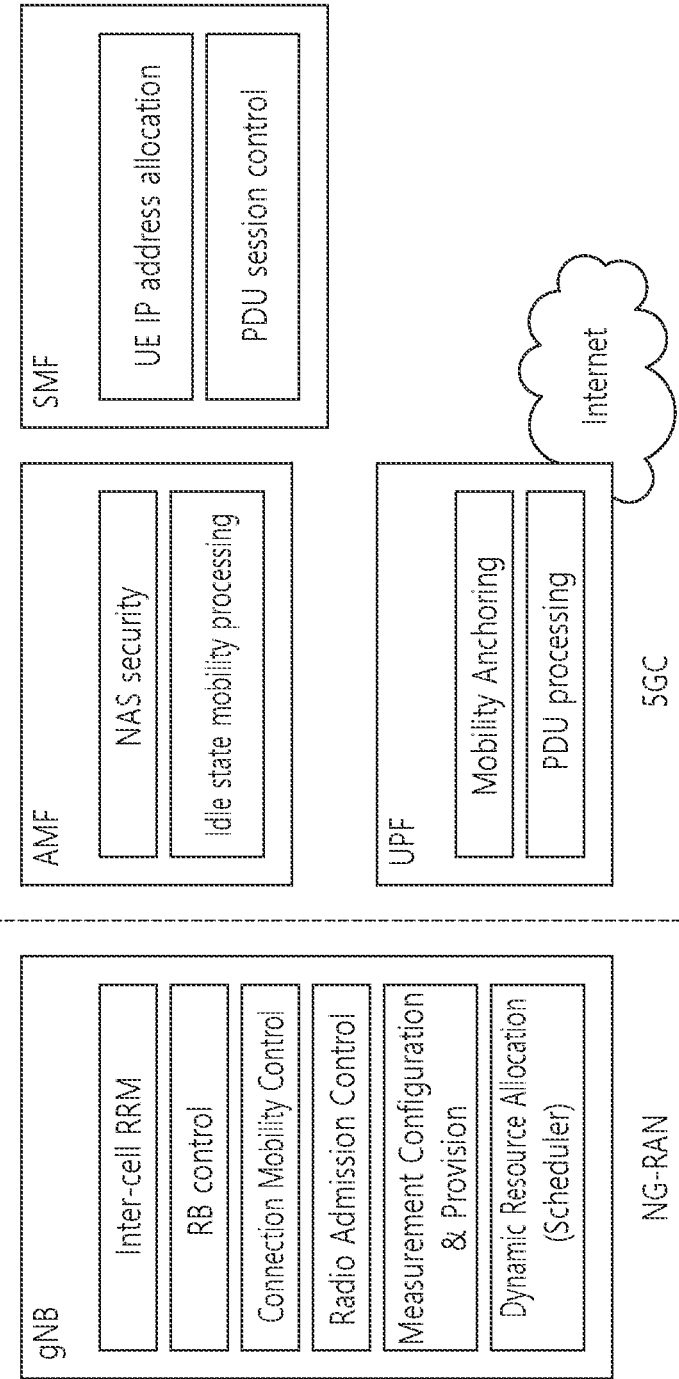
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, (a) of FIG. 4 shows a radio protocol architecture for a user plane, and (b) of FIG. 4 shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
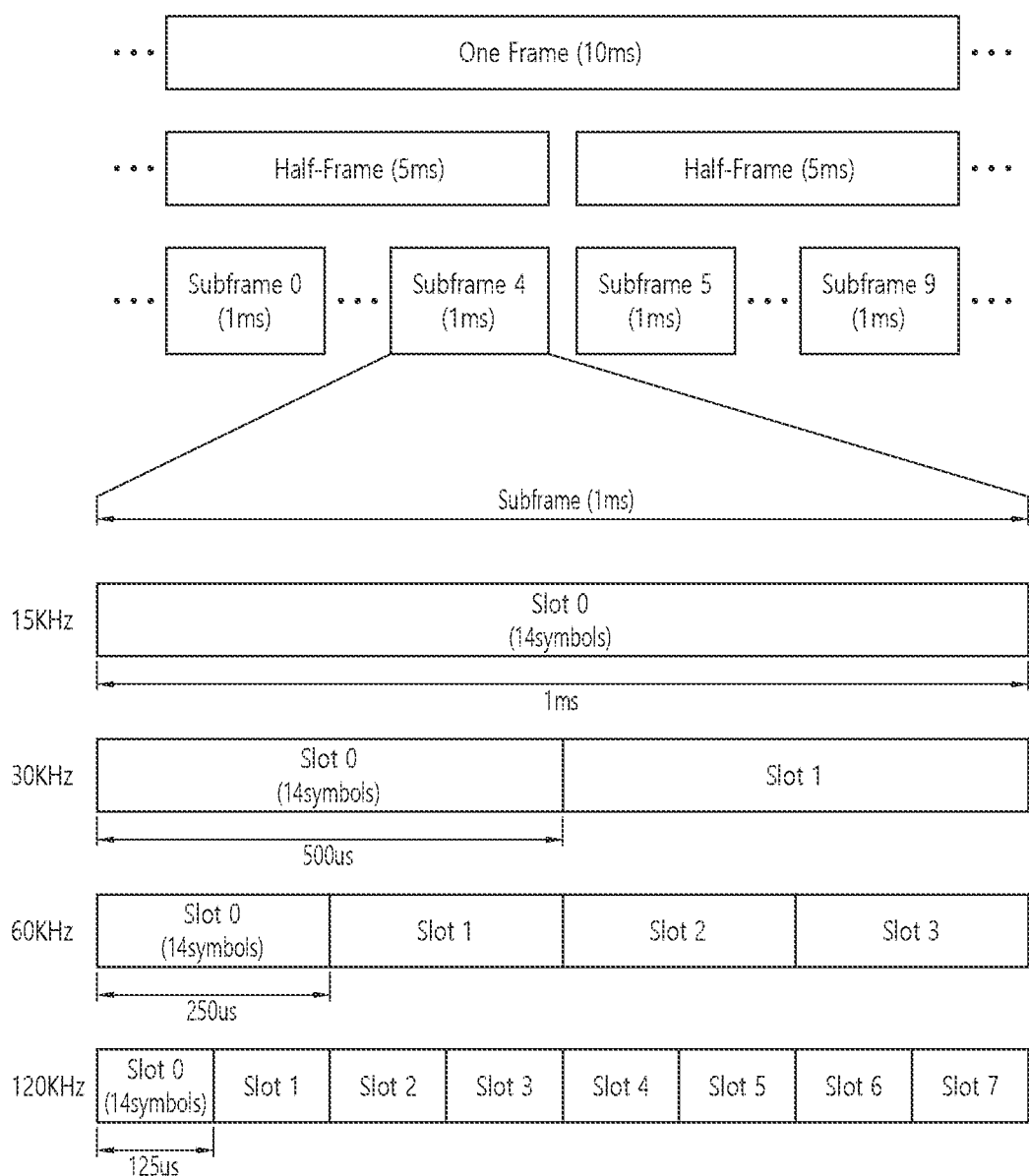
FIG. 5 shows a structure of a wireless frame of an NR, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
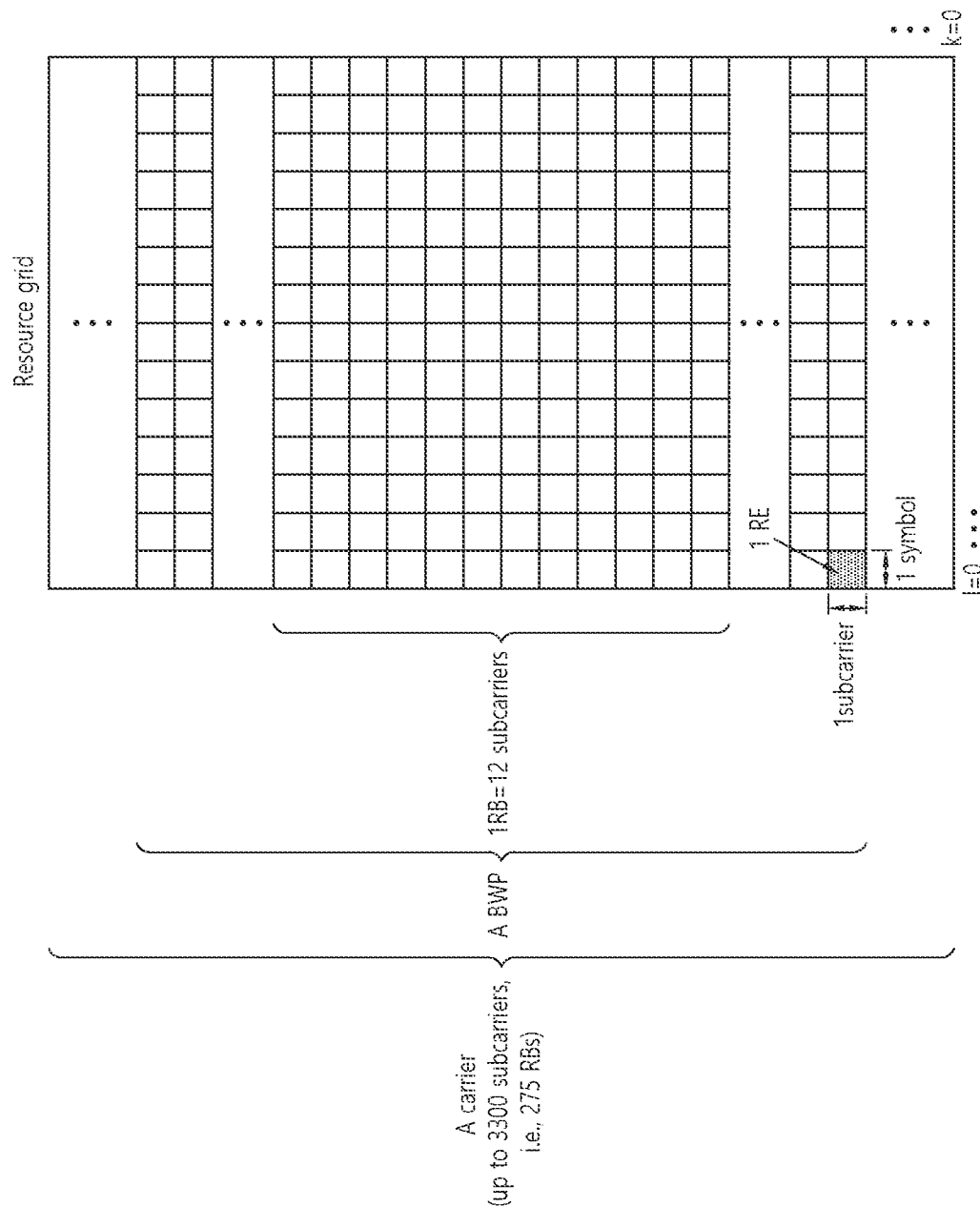
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
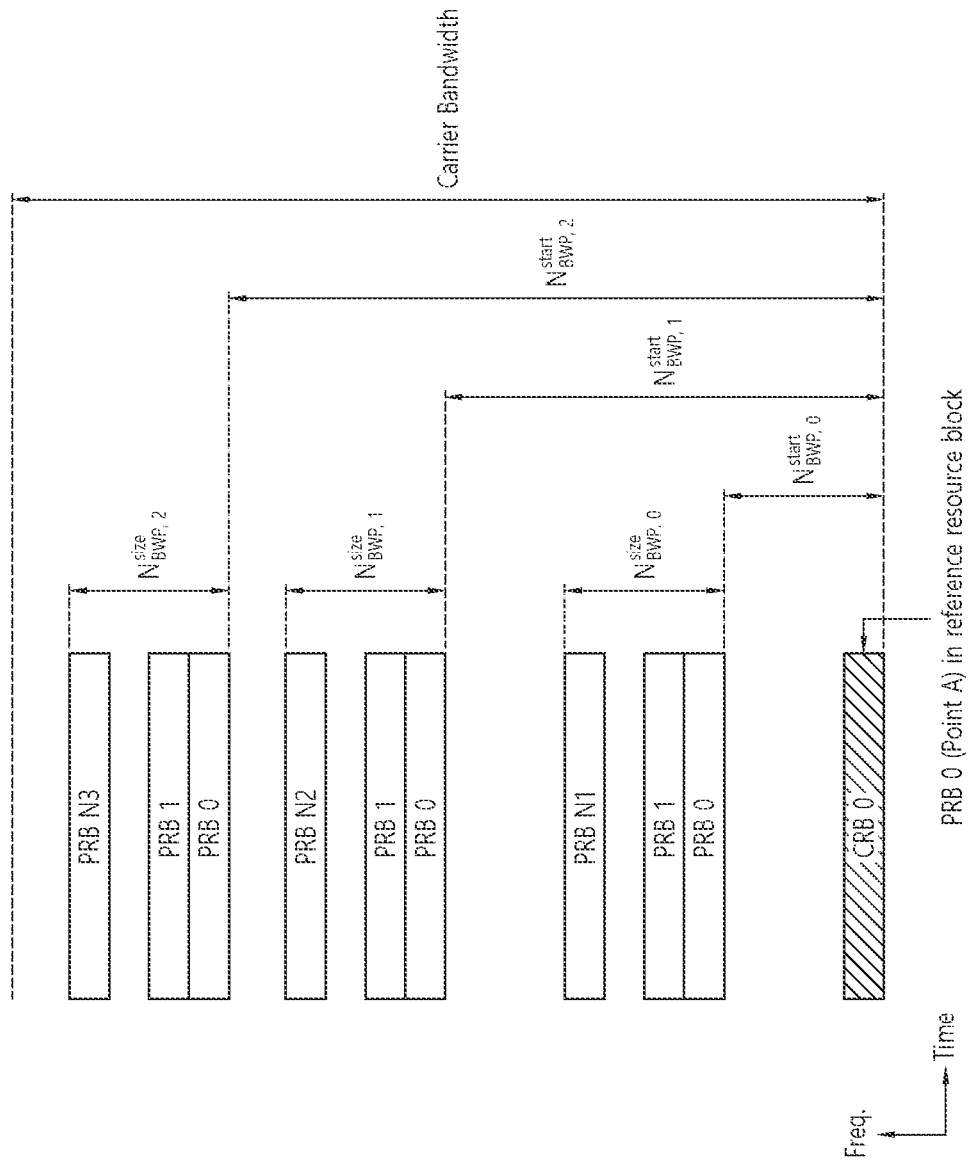
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, (a) of FIG. 8 shows a user plane protocol stack, and (b) of FIG. 8 shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
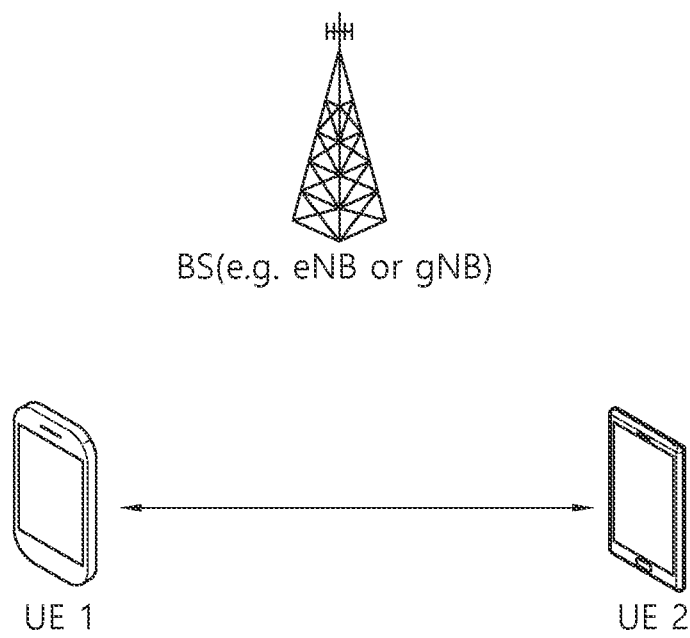
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof Hereinafter, resource allocation in SL will be described.

Figure 10:
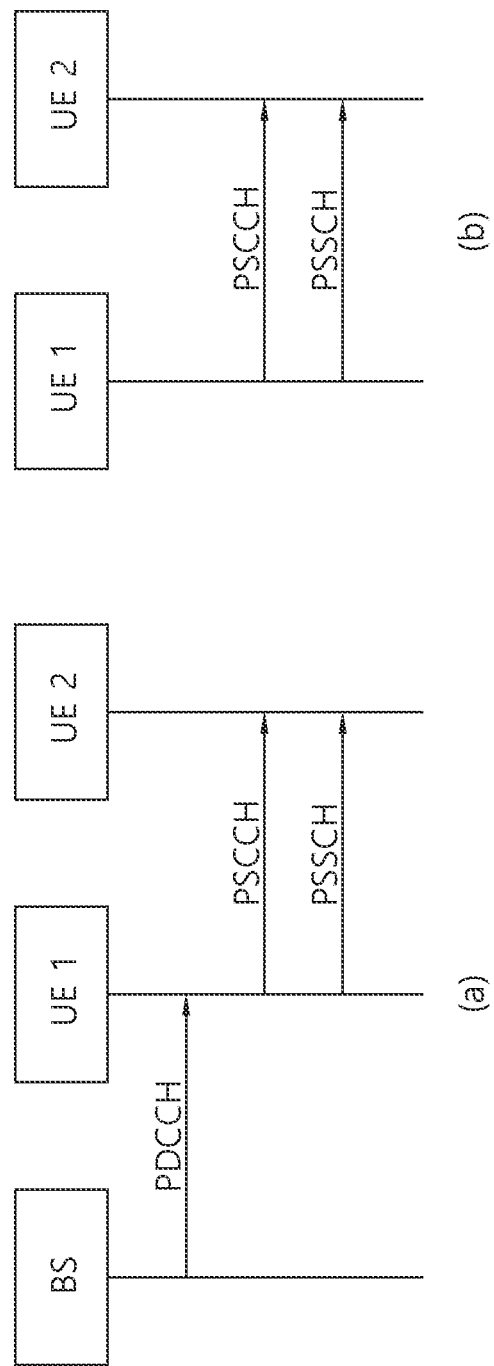
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 10 shows a UE operation related to an LTE transmission mode 1 or an LTE transmission mode 3. Alternatively, for example, (a) of FIG. 10 shows a UE operation related to an NR resource allocation mode 1. For example, the LTE transmission mode 1 may be applied to general SL communication, and the LTE transmission mode 3 may be applied to V2X communication.

For example, (b) of FIG. 10 shows a UE operation related to an LTE transmission mode 2 or an LTE transmission mode 4. Alternatively, for example, (b) of FIG. 10 shows a UE operation related to an NR resource allocation mode 2.

Referring to (a) of FIG. 10, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE lmay perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 10, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
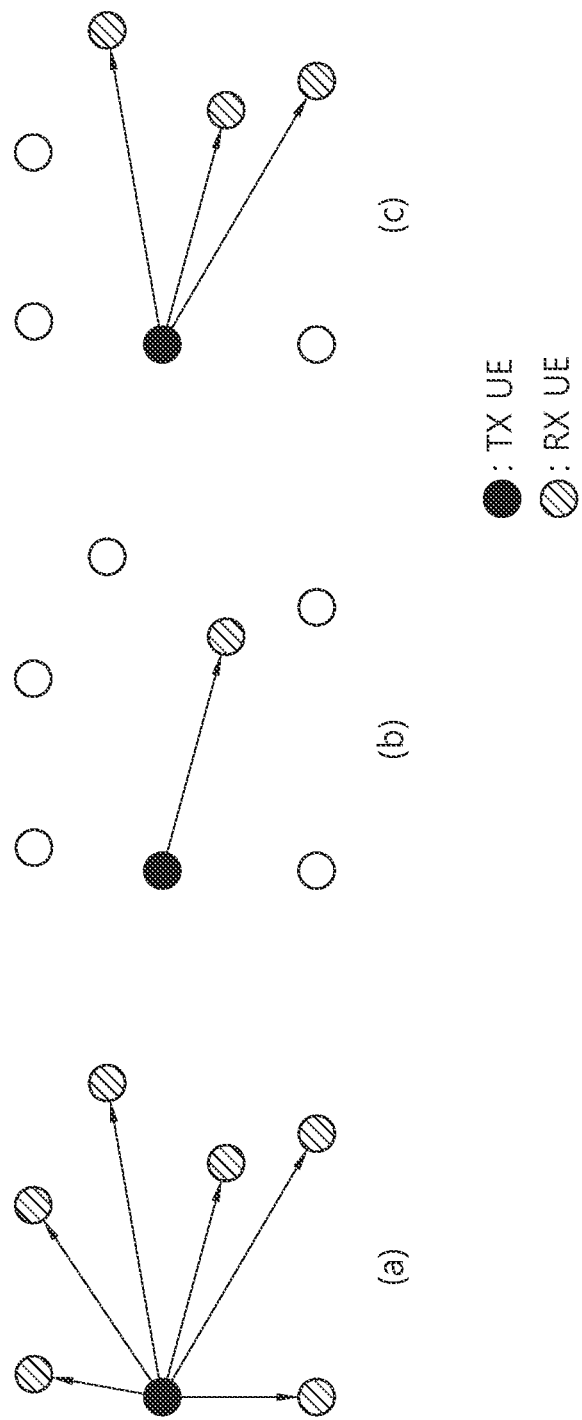
FIG. 11 shows three cast types, in accordance with an embodiment of the present disclosure.

FIG. 11 show three cast types, in accordance with an embodiment of the present disclosure. The embodiment of FIG. 11 may be combined with various embodiments of the present disclosure. Specifically, (a) of FIG. 11 shows broadcast-type SL communication, (b) of FIG. 11 shows unicast type-SL communication, and (c) of FIG. 11 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, etc.) or V2X communication but also to sidelink communication or V2X communication based on a Uu interface (e.g., PUSCH, PDSCH, PDCCH, PUCCH, etc.).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or a WAN DL signal (e.g., PDCCH, PDSCH, PSS/SSS, etc.). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS. etc.). The transmitting operation of the UE may include a transmitting operation of a WAN UL channel and/or a WAN UL signal (e.g., PUSCH, PUCCH, SRS, etc.). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

Meanwhile, as groupcast communication is supported in NR sidelink (SL), various features for groupcast communication are being discussed. In particular, a communication technology for next-generation communication systems (e.g., NR) that require high reliability and low-latency, such as, for example, vehicle control signals to be transmitted to autonomous vehicles (or automobiles) is being discussed. For example, if a block error rate (BLER) targeted by the conventional communication system (e.g., LTE) is $10^\wedge-2$, in the next-generation communication system (e.g., NR), in case of the BLER$<<10^\wedge-2$, high reliability and very low latency may be required by targeting, for example, a case of BLER is $10^\wedge-5$.

An SL HARQ feedback operation is one of the features for high reliability and extremely low delay, and hereinafter, the SL HARQ feedback operation will be described in FIG. 12. Meanwhile, the following SL HARQ feedback operation is not performed only in a groupcast communication environment, but may also be performed in a broadcast communication environment, a unicast communication environment, and the like.

Figure 12:
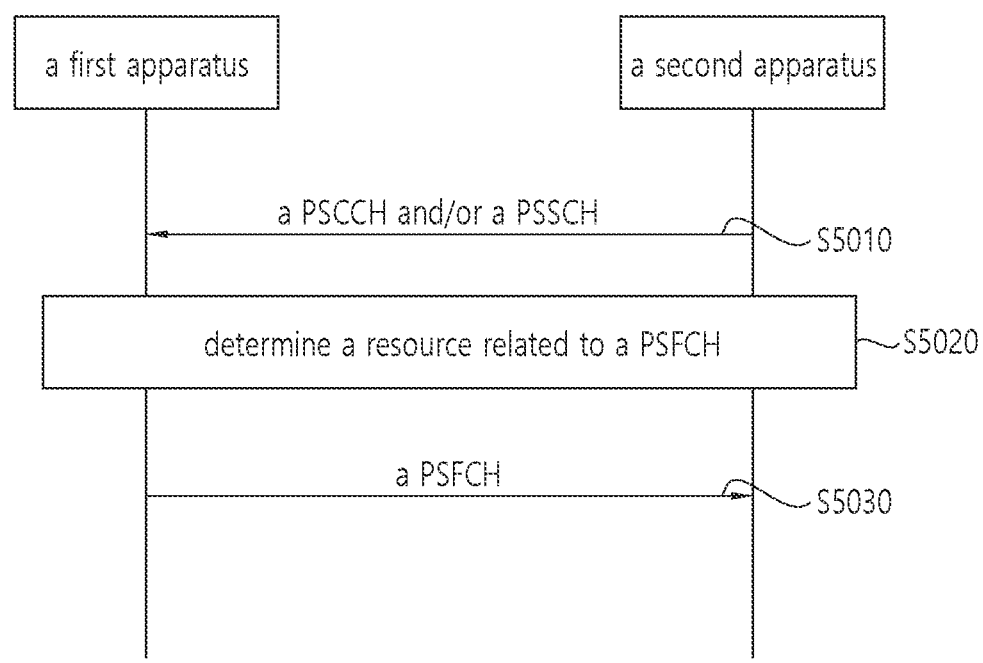
FIG. 12 shows an SL HARQ feedback transmission/reception procedure according to an embodiment of the present disclosure.

FIG. 12 shows an SL HARQ feedback transmission/reception procedure according to an embodiment of the present disclosure. The embodiments of FIG. 12 may be combined with various embodiments of the present disclosure.

Referring to FIG. 12, in step S5010, a first apparatus may receive a physical sidelink control channel (PSCCH) and/or a physical sidelink shared channel (PSSCH) from a second apparatus. For example, the second apparatus may transmit the PSCCH and/or the PSSCH to the first apparatus.

In step S5020, the first apparatus may determine a resource related to a physical sidelink feedback channel (PSFCH). For example, the resource related to the PSFCH may be a resource used by the first apparatus to transmit the PSFCH. For example, the second apparatus may determine a resource related to the PSFCH. For example, the resource related to the PSFCH may be a resource used by the second apparatus to receive the PSFCH.

For example, the resource related to the PSFCH may be determined based on at least one of a resource related to the PSCCH, a resource related to the PSSCH, an identification (ID) of a first apparatus, and/or an ID of a second apparatus. For example, the resource related to the PSCCH may be a resource used by the second apparatus to transmit the PSCCH. For example, the resource related to the PSCCH may be a resource used by the first apparatus to receive the PSCCH. For example, the resource related to the PSSCH may be a resource used by the second apparatus to transmit the PSSCH. For example, the resource related to the PSSCH may be a resource used by the first apparatus to receive the PSSCH.

In step S5030, in response to the PSCCH and/or PSSCH, the first apparatus may transmit SL HARQ feedback information to the second apparatus through the PSFCH. For example, in response to the PSCCH and/or PSSCH, the second apparatus may receive SL HARQ feedback information from the first apparatus through the PSFCH.

For example, based on an HARQ feedback option 1 (which may also be denoted as Option 1 or a first SL HARQ feedback option), the first apparatus that fails to receive the PSSCH may transmit a HARQ NACK to the second apparatus. For example, based on HARQ feedback option 1, the first apparatus that has successfully received the PSSCH may not transmit a HARQ ACK to the second apparatus.

For example, based on a HARQ feedback option 2 (which may also be denoted as Option 2 or a second SL HARQ feedback option), the first apparatus that fails to receive the PSSCH may transmit a HARQ NACK to the second apparatus. For example, based on a HARQ feedback option 2, the first apparatus that has successfully received the PSSCH may transmit a HARQ ACK to the second apparatus.

Figure 13:
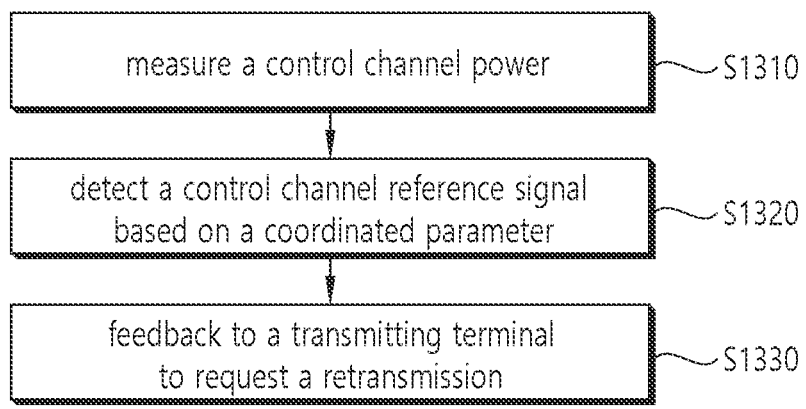
FIG. 13 shows a flowchart illustrating a method for a first apparatus to transmit SL HARQ feedback information according to an embodiment of the present disclosure.

FIG. 13 shows a flowchart illustrating a method for a first apparatus to transmit SL HARQ feedback information according to an embodiment of the present disclosure.

In the present disclosure, among two apparatuses (or terminals) performing SL communication with each other, an apparatus initially transmitting a physical sidelink shared channel (PSSCH) and/or a physical sidelink control channel (PSCCH) is referred to as a "transmitting apparatus", and an apparatus performing an SL HARQ feedback for data is referred to as a "receiving apparatus". In the present disclosure, the transmitting apparatus may be replaced by various terms such as a second apparatus, a transmitting terminal, a transmission terminal, a transmission apparatus, a TX UE, a transmission UE, a transmitting UE, a transmitter UE, a UE, and the like, and the receiving apparatus be replaced by various terms such as a first apparatus, a receiving terminal, a reception terminal, a reception apparatus, an RX UE, a reception UE, a receiving UE, a receiver UE, a UE, and the like.

In addition, since the "transmitting apparatus" and the "receiving apparatus" are classified based on whether the PSSCH and/or PSCCH are initially transmitted, whether an SL HARQ feedback for the PSSCH and/or PSCCH is performed, and the like, people skilled in the art may easily understand that the transmitting apparatus may be switched to the receiving apparatus, and the receiving apparatus may be switched to the transmitting apparatus as the time changes.

Table 5 below describes two SL HARQ feedback options for supporting HARQ feedback in groupcast communication. In the present disclosure, "SL HARQ feedback option" may be replaced with various terms such as option, HARQ feedback option, HARQ option, and the like, and "first and/or second SL HARQ feedback option" may be replaced with various terms such as option 1 and/or option 2, option 1 and/or option 2, first and/or second HARQ feedback option, HARQ option 1 and/or 2, and the like.

TABLE 5

When SL HARQ feedback is enabled for groupcast, the following operations are further studied for the non-CBG case:
Option 1: Receiver UE transmits HARQ-NACK on PSFCH if it fails to decode the corresponding TB after decoding TABLE 5-continued the associated PSCCH. It transmits no signal on PSFCH otherwise. Details are FFS including the following:
Whether to introduce an additional criterion in deciding HARQ-NACK transmission/
Whether/how to handle DTX issue (i.e., transmitter UE cannot recognize the case that a receiver UE misses PSCCH scheduling PSSCH)/
Issues when multiple receiver UEs transmit HARQ-NACK on the same resource/
How to determine the presence of HARQ-NACK transmissions from receiver UEs
Whether/how to handle destructive channel sum effect of HARQ-NACK transmissions from multiple receiver UEs if the same signal is used/
Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE.
Details are FFS including the following:
Whether to introduce an additional criterion in deciding HARQ-ACK/NACK transmission/
How to determine the PSFCH resource used by each receiver UE/
FFS whether to support SL HARQ feedback per CBG
Other options are not precluded.

In Table 5, Option 1 (or the first SL HARQ feedback option) indicates an option of feeding back the HARQ-NACK message to the transmitting apparatus only when the receiving apparatus fails to decode data. When both HARQ ACK and HARQ NACK are fed back, resources related to HARQ ACK and HARQ NACK should be allocated. Allocating resources related to HARQ ACK and HARQ NACK to all transmitting apparatuses may be inefficient in terms of resource efficiency. For example, if the time and/or frequency domain sharing the HARQ feedback resource is configured, and the HARQ feedback information is transmitted through the time and/or frequency domain in the manner of Option 1 (or the first SL HARQ feedback option), resources may be used more efficiently. In addition, in the point of a retransmission, the retransmission may be performed efficiently with small resource since retransmission may be performed when NACK is detected in a common resource without determining HARQ ACK and/or HARQ NACK for each of all apparatuses.

However, when only the HARQ NACK is fed back to the transmitter as in the case of Option 1 (or the first SL HARQ feedback option), a DTX issue may occur. The DTX issue represents a state where the transmitting apparatus may not perform a retransmission although control information (or data information) is in a missing state in the receiving apparatus since the transmitting apparatus does not know whether the control information (or data information) in the receiving apparatus is in a missing state. Here, the 'missing state of control information' may indicate a case in which the receiving apparatus fails to receive a scheduling message of a groupcast that is attempted to be received in a specific time and/or frequency resource.

In the following embodiments, a method for solving the DTX issue occurring in the first SL HARQ feedback option (or Option 1, or NACK only transmission) of NR V2X is proposed. Although the following embodiments are mainly described based on application to groupcast, use in other scenarios such as broadcast or unicast communication is not excluded.

As disclosed in the flowchart of FIG. 13, the first apparatus according to an embodiment may measure a control channel power (S1310), detect a control channel reference signal based on a coordinated parameter (S1320), and transmit feedback information to the transmitting terminal to request a retransmission (S1330). Hereinafter, content related to each disclosed step shown in the flowchart of FIG. 13 will be described in more detail.

Even if control information (e.g., PSCCH) is in missing state in the receiving apparatus, if the receiving apparatus may know (recognize) that the received signal is a signal transmitted from a group member of a specific group including the receiving apparatus, the DTX problem may be solved.

First, in order to determine whether control information is in missing state during a reception time, for example, a reference signal (RS) transmitted based on a control channel may be used. More specifically, the receiving apparatus may determine (or decide) whether the PSCCH has been received or is in missing state based on a power value measured from an RS (eg, PSCCH DM-RS) transmitted based on a control channel (e.g., PSCCH) through which control information is to be transmitted. For example, when the measured power value is higher than a specific threshold, the receiving apparatus may determine that control information has been received. Conversely, when the measured power value is lower than the specific threshold, the receiving apparatus may determine that the control information has not been received (or the state is in missing state).

A threshold may be used to determine whether control information (e.g., PSCCH) is received. In one example, when determining a corresponding threshold, a (long-term) RSRP value may be used to determine link quality when forming a session. The RS used when deriving the RSRP value may include, for example, a DM-RS on the PSCCH or a predefined measurement RS (eg, CSI-RS). In this case, the transmitting apparatus may use the transmission power in a fixed manner, which may indicate a case in which power control of the transmitting apparatus is not performed.

If the power control mechanism is supported by the transmitting device to change the power of the transmitting device, the transmitting device may transmit its (absolute) transmission power (or power) to the receiving device. The receiving device may measure the link quality between the receiving device and the transmitting device based on information about the transmission power (or power) of the transmitting device received from the transmitting device.

Even when it is determined that the receiving apparatus has received the control information, the receiving apparatus may not know whether the received control information is a signal transmitted from a specific group member of the group to which the receiving apparatus belongs, or a signal transmitted from an apparatus outside the group. Accordingly, if the receiving apparatus may know in advance whether the received control information is transmitted from which apparatus, the receiving apparatus may determine whether the control information to be received has been received or is in a missing state.

In one example, RS (eg, PSCCH DM-RS) to be transmitted through control information within a group may be coordinated among group members within the group. The coordination method may be various, and the following two embodiments will be described as an example.

In an embodiment, a cyclic shift (CS) value or an orthogonal cover code (OCC) value of a DM-RS generation sequence may be shared among group members. For example, to distinguish between a plurality of apparatuses, the CS is reflected in the DM-RS generation sequence or the OCC is multiplied and mapped to the resource and transmitted. In this case, the maximum number of CSs or OCCs possible from the DM-RS generation sequence may be predefined, and what CS or OCC each group member uses may be shared among group members. This sharing scheme may define, for example, to reserve a specific CS (or CS set) or OCC (or OCC set) at the maximum CS or OCC, and represent the method of distributing some of CS or OCC where the group header is reserved when the receiving apparatus joins the group (or when forming a session in a group). Alternatively, when the receiving apparatus joins the group, it may voluntarily select a specific CS or OCC and notify the group members in the group.

In another embodiment, a candidate RS parameter (e.g., CS, OCC, etc.) exists in advance, and an apparatus may use an RS parameter not used by other apparatuses through an operation such as SL sensing, or may use a relatively low RS RSRP (or channel RSSI) RS parameter or RSRP parameter indicating a lowest X % of RS RSRP (or channel RSSI). This embodiment may be particularly relevant to the case where the candidate RS parameter is already being used by other apparatuses. Alternatively, one RS parameter may be arbitrarily selected from among the candidate RS parameters. However, when selecting an RS parameter arbitrarily, since a collision may occur by selecting the same RS parameter among a plurality of apparatuses, the operation of arbitrarily selecting an RS parameter may be performed in a relatively good channel environment (e.g., when CBR is low).

According to the coordination methods, the receiving apparatus may check whether the control channel exists based on a measured power in the control channel, and may determine whether it is a signal received from one of the group members in the group based on the reserved RS-related parameter. For example, when TX UE A, a group member of a specific group, transmits RS using RS sequence CS 1 reserved for the group, and RX UE B, a group member of the specific group, detects CS 1 based on a blind detection for the RS, RX UE B may confirm that CS 1 is transmitted from a specific group member within the group based on RS coordination performed in advance, and inform TX UE A that retransmission is required according to the missing state of control information. When RX UE B requests retransmission from TX UE A, the RX UE B may use a feedback channel (e.g., PSFCH) or use a data or control channel (e.g., PSCCH, PSSCH).

In one example, if it is specified to use the PSFCH channel for DTX signaling, the RX UE B may not explicitly recognize information about the resource location of the PSFCH channel when the control channel is in missing state. In order to solve this problem, a reserved resource for DTX signaling related to the RS parameter may be defined. The reserved resource may be, for example, the same resource as the PSFCH resource based on PSCCH, since the purpose of DTX signaling is retransmission of TX UE A, such as NACK feedback. However, depending on the DTX, the TX UE A may adjust the transmission power (e.g., it may be necessary to increase the retransmission power according to the DTX than the initial transmission), in which case independent resource regulation may be required. Corresponding resources may be defined in association with RS parameters in advance, or may be defined and signaled at higher levels.

In another embodiment, the apparatuses performing groupcast communication may preconfigure the RS resource for the control channel to be orthogonal to the RS resource for the control channel of other apparatuses outside the group. In one example, coordination may be performed on a parameter (e.g., CS or OCC) of an RS sequence to be mapped to an orthogonal resource. When the coordination of RS sequence parameters is performed by being limited to the orthogonal resource area, the parameter of RS sequence to be mapped to the orthogonal resource may be coordinated in the group without prior RS coordination (e.g., operation to reserve CS or OCC) between the group member and other apparatuses outside the group.

Figure 14:
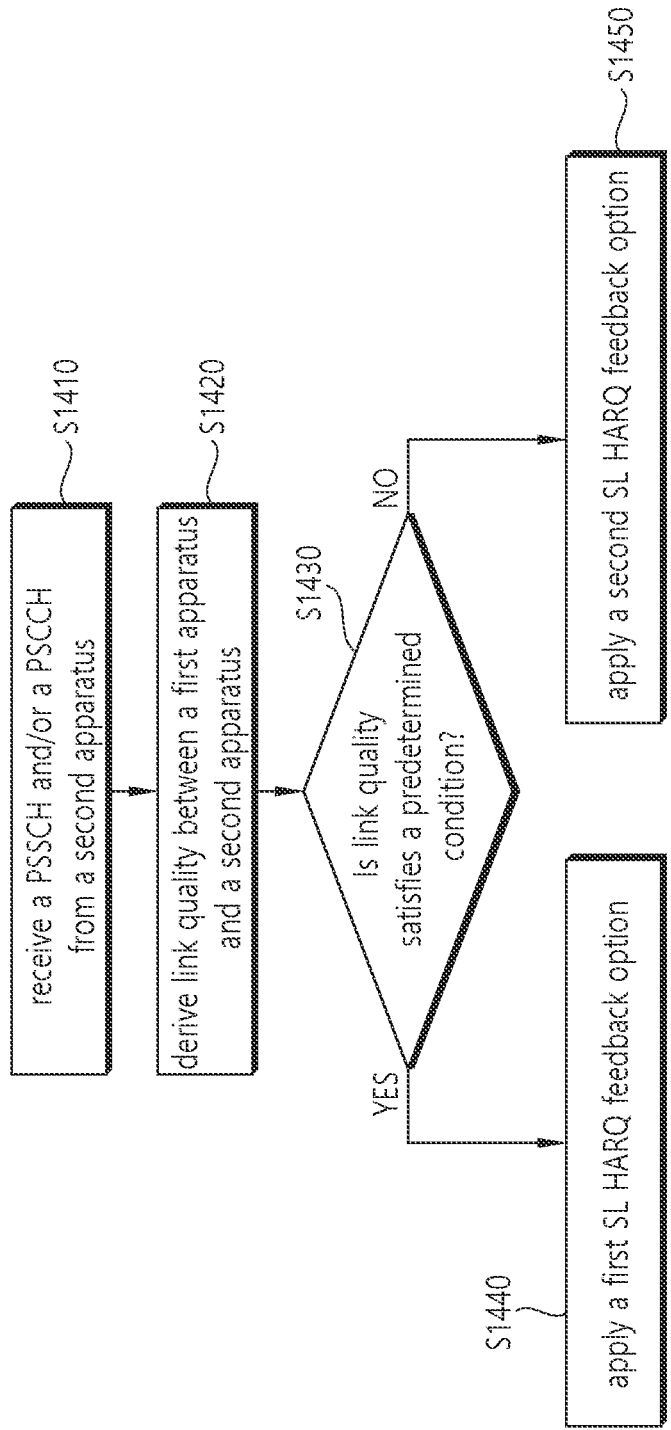
FIG. 14 is a flowchart illustrating a method of determining an SL HARQ option applied when a first apparatus transmits SL HARQ feedback information according to an embodiment of the present disclosure.

FIG. 14 is a flowchart illustrating a method of determining an SL HARQ option applied when a first apparatus transmits SL HARQ feedback information according to an embodiment of the present disclosure.

For another way to solve the DTX issue, a mode for transmitting both HARQ ACK and/or HARQ NACK (the Option 2) and a mode for transmitting only HARQ NACK (the first SL HARQ feedback option) may be used in a hybrid format. In one example, one of the first SL HARQ feedback option and the second SL HARQ feedback option may be selected in consideration of at least one of the number of group members or link quality between group members.

When both HARQ ACK and HARQ NACK are fed back, the transmitting apparatus expects HARQ ACK if the receiving apparatus succeeds in data decoding, and expects HARQ NACK if it fails. Therefore, if the transmitting apparatus performs the initial transmission and no HARQ ACK is received for a certain period of time, the receiving apparatus may determine that it is in a data-missing state and perform a corresponding process. That is, if HARQ ACK and HARQ NACK are transmitted together as in the second SL HARQ feedback option scheme, the DTX issue may be solved.

Hereinafter, in order to support the first SL HARQ feedback option and the second SL HARQ feedback option in a hybrid manner, a method of considering at least one of "the number of members in a group" or "link quality between group members" (e.g., RSRP, RSRQ, RSSI, physical distance, etc) is examined.

Reference signal received power (RSRP) may indicate the average received power of all REs carrying the CRS transmitted over the entire band. In this case, the average received power of all REs carrying the CSI RS may be measured instead of the CRS.

Received signal strength indicator (RSSI) may indicate received power measured in the entire band. RSSI may include signals, interference, thermal noise, and the like. Reference symbol received quality (RSRQ) indicates CQI, and may be determined as RSRP/RSSI according to a measurement bandwidth or subband. That is, RSRQ may mean a signal-to-noise interference ratio (SINR). Since RSRP does not provide sufficient mobility information, RSRQ may be used instead of RSRP in a handover or cell reselection process. In one example, it may be calculated as RSRQ=RSSI/RSSP. Alternatively, RSRQ=N*RSSI/RSSP may be calculated. Here, N may be a variable (e.g., the number of PRBs) or a function related to the bandwidth for measuring RSSI.

In one example, when the number of group members is less than a threshold value, it may be defined that the second SL HARQ feedback option is applied in the HARQ feedback operation between members in the corresponding group. When the number of group members is equal to or greater than the threshold value, it may be defined that the first SL HARQ feedback option is applied in the HARQ feedback operation between members in the corresponding group. A threshold value used as a criterion for determining the number of group members may be defined based on information previously received from the base station.

In another example, either the first SL HARQ feedback option or the second SL HARQ feedback option may be applied to the HARQ feedback operation between group members based on the link quality between each group member. For example, the second SL HARQ feedback option may be applied to a link having a low RSRP value, a low RSRP value or a high RSSI value between group members, or having a long physical distance between group members (or apparatuses within the group). This is because we can expect DTX issues to occur more frequently when the link is relatively bad. In addition, the first SL HARQ feedback option may be applied to a link having a high RSRP value, a high RSRQ value, a low RSSI value, or having a close physical distance between group members (or apparatuses within the group).

In another example, although it is specified that the first SL HARQ feedback option is applied to the corresponding group based on the number of group members, the second SL HARQ feedback may be applied to the HARQ feedback operation between group members based on the link quality between each group member. For example, even if it is specified that the first SL HARQ feedback option is applied to the group based on the number of group members, The second SL HARQ feedback option may be applied to a link having a low RSRP value, a low RSRP value or a high RSSI value between group members or having a long physical distance between group members (or apparatuses within the group). In addition, the first SL HARQ feedback option may be applied to a link having a high RSRP value between group members, a high RSRQ value or a low RSSI value, or a close physical distance between group members (or apparatuses within the group).

In a more specific example, based on a determination that the distance between the first apparatus and the second apparatus is less than a first threshold value, the SL HARQ feedback option may be determined as the first SL HARQ feedback option, and based on a determination that the distance between the first apparatus and the second apparatus is equal to or greater than the first threshold value, the SL HARQ feedback option may be determined as the second SL HARQ feedback option.

Alternatively, based on a determination that the RSRP value is greater than or equal to a second threshold value, the SL HARQ feedback option may be determined as the first SL HARQ feedback option, and based on a determination that the RSRP value is less than the second threshold value, the SL HARQ feedback option may be determined as the second SL HARQ feedback option. In one example, the second threshold value may be an integer less than $10^3$, and the unit of the second threshold value may be dBm. However, the second threshold value is not limited by the above example.

Alternatively, based on a determination that the RSRQ value is greater than or equal to a third threshold value, the SL HARQ feedback option may be determined as the first SL HARQ feedback option, and based on a determination that the RSRQ value is less than the third threshold value, the SL HARQ feedback option may be determined as the second SL HARQ feedback option. In one example, the third threshold value may be an integer less than $10^3$, and the unit of the third threshold value may be dB. However, the third threshold value is not limited by the example.

Alternatively, based on a determination that the RSSI value is less than a fourth threshold value, the SL HARQ feedback option may be determined as the first SL HARQ feedback option, and based on a determination that the RSSI value is greater than or equal to the fourth threshold value, the SL HARQ feedback option may be determined as the second SL HARQ feedback option. In one example, the fourth threshold may be an integer less than $10^3$, and the unit of the fourth threshold may be dBm. However, the fourth threshold is not limited by the above example.

In another example, in order to support the first SL HARQ feedback option and the second SL HARQ feedback option in a hybrid manner, a method of solely considering "link quality between group members" may be provided as shown in FIG. 14. The first apparatus (or the receiving apparatus) according to an embodiment may receive the PSSCH and/or the PSCCH from the second apparatus (or the transmitting apparatus) (S1410), and derive the link quality between the first apparatus and the second apparatus (S1420). After determining whether the link quality satisfies the predetermined condition (S1430), the first apparatus may apply the first SL HARQ feedback option based on a determination that the link quality satisfies the predetermined condition (S1440), or may apply the second SL HARQ feedback option based on a determination that the link quality does not satisfy a predetermined condition (S1450). The predetermined condition may indicate a determination method based on the above-described first to fourth threshold values.

Figure 15:
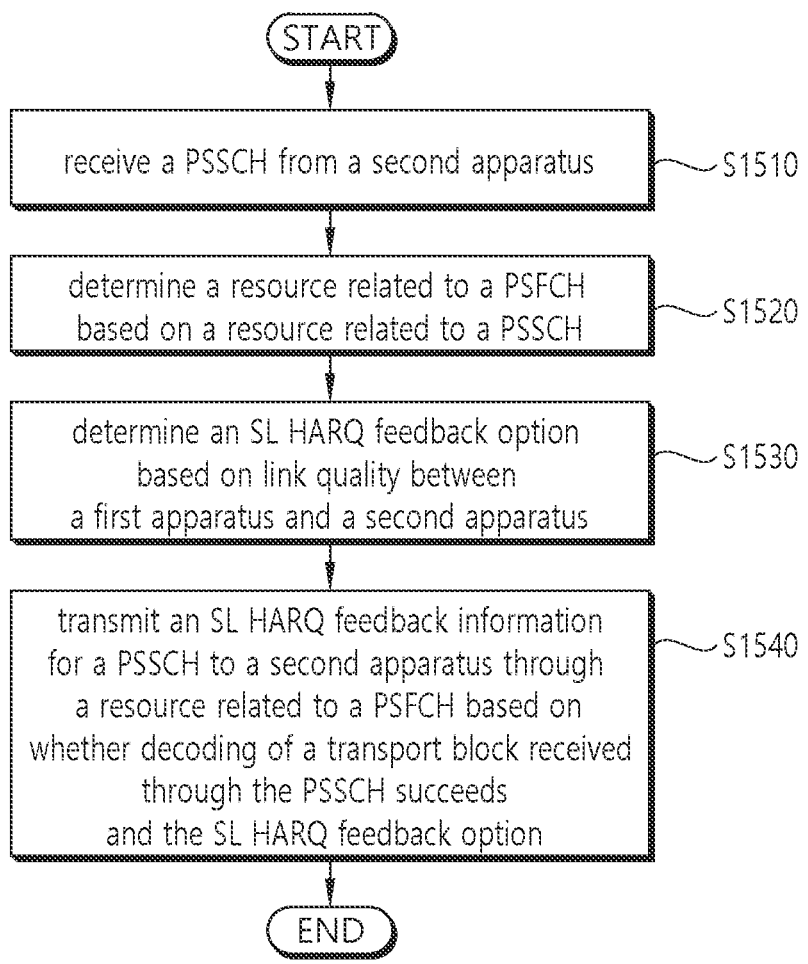
FIG. 15 is a flowchart illustrating an operation of a first apparatus according to an embodiment of the present disclosure.

FIG. 15 is a flowchart illustrating an operation of a first apparatus according to an embodiment of the present disclosure.

The operations disclosed in the flowchart of FIG. 15 may be performed in combination with various embodiments of the present disclosure. In one example, the operations disclosed in the flowchart of FIG. 15 may be performed based on at least one of the apparatuses illustrated in FIGS. 17 to 22. In another example, the operations disclosed in the flowchart of FIG. 15 may be performed in combination with the operations illustrated in the flowcharts of FIGS. 12 to 14 in various ways. In one example, the first apparatus of FIG. 15 may correspond to the first wireless device 100 of FIG. 18 to be described later. In another example, the first apparatus of FIG. 15 may correspond to the second wireless device 200 of FIG. 18 to be described later.

In step S1510, the first apparatus according to an embodiment may receive a physical sidelink shared channel (PSSCH) from a second apparatus. In an example, the first apparatus may receive PSSCH and/or physical sidelink control channel (PSCCH) from the second apparatus.

In step S1520, the first apparatus according to an embodiment may determine a resource related to a physical sidelink feedback channel (PSFCH) based on a resource related to the PSSCH.

In step S1530, the first apparatus according to an embodiment may determine an SL HARQ feedback option based on link quality between the first apparatus and the second apparatus. In an example, the SL HARQ feedback option may be determined from among the first SL HARQ feedback option (or Option 1) or the second SL HARQ feedback option (or Option 2) based on group information of a group receiving the PSSCH and/or the PSCCH transmitted from the second apparatus based on groupcast. However, the example is not limited to transmission based on groupcast, and in another example, step S1530 may be applied to transmission based on broadcast or unicast.

In step S1540, the first apparatus according to an embodiment may transmit SL HARQ feedback information for the PSSCH through the resource related to the PSFCH based on whether decoding of a transport block received through the PSSCH succeeds and the SL HARQ feedback option. Alternatively, the first apparatus according to another embodiment may transmit SL HARQ feedback information for the PSSCH to the second apparatus through a resource related to the PSFCH based on whether decoding of a transport block received through the PSCCH succeeds and the SL HARQ feedback option.

In an embodiment, the SL HARQ feedback option may be determined to one of a first SL HARQ feedback option or a second SL HARQ feedback option.

In an embodiment, an HARQ-negative acknowledgement (NACK) based on unsuccessful decoding of the transport block may be included in the SL HARQ feedback information based on a determination that the SL HARQ feedback option is the first SL HARQ feedback option. In this case, an HARQ-acknowledgement (ACK) based on successful decoding of the transport block may not be transmitted to the second apparatus.

In an embodiment, either the HARQ-NACK or HARQ-ACK based on successful decoding of the transport block may be included in the SL HARQ feedback information based on a determination that the SL HARQ feedback option is the second SL HARQ feedback option. In addition, based on a determination that the SL HARQ feedback option is the second SL HARQ feedback option, the HARQ-NACK may be included in the SL HARQ feedback information and transmitted to the second apparatus when a decoding for the transport block fails.

In an embodiment, the link quality may be derived based on at least one of a distance between the first apparatus and the second apparatus, a reference signal received power (RSRP) value, a reference signal received quality (RSRQ) value or a reference signal strength indicator (RSSI) value derived based on the first apparatus and the second apparatus.

In an embodiment, for a channel estimation or channel state measurement, the first apparatus and/or the second apparatus may use a reference signal (RS) which is recognized by both the first apparatus and the second apparatus.

In an embodiment, the SL HARQ feedback option may be determined to the first SL HARQ feedback option based on a determination that the distance between the first apparatus and the second apparatus is less than a first threshold value. In addition, the SL HARQ feedback option may be determined to the second SL HARQ feedback option based on a determination that the distance between the first apparatus and the second apparatus is bigger than or equal to the first threshold value.

In an embodiment, the SL HARQ feedback option may be determined to the first SL HARQ feedback option based on a determination that the RSRP value is bigger than or equal to a second threshold value. In addition, the SL HARQ feedback option may be determined to the second SL HARQ feedback option based on a determination that the RSRP value is less than the second threshold value.

In an embodiment, the SL HARQ feedback option may be determined to the first SL HARQ feedback option based on a determination that the RSRQ value is bigger than or equal to a third threshold value. In addition, the SL HARQ feedback option may be determined to the second SL HARQ feedback option based on a determination that the RSRQ value is less than the third threshold value.

In an embodiment, the SL HARQ feedback option may be determined to the first SL HARQ feedback option based on a determination that the RSSI value is less than a fourth threshold value. In addition, the SL HARQ feedback option may be determined to the second SL HARQ feedback option based on a determination that the RSSI value is bigger than or equal to the fourth threshold value.

In an embodiment, the SL HARQ feedback option may be determined to either the first SL HARQ feedback option or the second SL HARQ feedback option based on the link quality and group information of a group receiving the PSSCH and the PSCCH transmitted from the second apparatus based on groupcast.

In an embodiment, the group information may include a total number of apparatuses included in the group. In other words, the total number of apparatuses included in the group may represent the number of group members in the group.

In an embodiment, the SL HARQ feedback option may be determined to the first SL HARQ feedback option based on a determination that the total number of the apparatuses included in the group is bigger than or equal to a fifth threshold value. In addition, the SL HARQ feedback option may be determined to the second HARQ feedback option based on a determination that the total number of the apparatuses included in the group is less than the fifth threshold value.

In an embodiment, the fifth threshold value may be derived based on threshold information about the total number of the apparatuses included in the group, received from the base station. The base station may be a gNB and/or an eNB, but examples of the base station are not limited to a gNB and/or an eNB. The threshold information on the total number of apparatuses may be referred to as threshold information on the number of group members. In one example, the threshold information for the total number of the apparatuses may be transmitted from the base station to the first apparatus and/or the second apparatus based on data information and/or control information. Alternatively, in one example, the fifth threshold value may be transmitted from an upper layer (e.g., an application layer) to a lower layer (e.g., a radio layer) of the first apparatus and/or the second apparatus. Each upper layer of the first apparatus and/or the second apparatus may receive the fifth threshold from the V2X server and transmit it to a lower layer.

The first to fifth threshold values described in the above embodiments represent arbitrary threshold values, and some of the threshold values frequently used for each indicator (e.g., RSRP, RSSI, RSRP, distance, etc) in the art may be used as one of the first to fifth threshold values. In an example, the first to fifth threshold values may be derived based on information received from the base station. In another example, the first to fifth threshold values may be calculated by the first apparatus and/or the second apparatus.

According to an embodiment of the present disclosure, a first apparatus transmitting sidelink hybrid automatic repeat request (SL HARQ) feedback information may be provided. The first apparatus may include: at least one memory storing instructions, at least one transceiver and at least one processor connecting the at least one memory and the at least one transceiver, wherein the at least one processor is configured to: control the at least one transceiver to receive a physical sidelink shared channel (PSSCH) from a second apparatus, determine a resource related to a physical sidelink feedback channel (PSFCH) based on a resource related to the PSSCH, determine an SL HARQ feedback option based on link quality between the first apparatus and the second apparatus, and control the at least one transceiver to transmit SL HARQ feedback information for the PSSCH to the second apparatus through a resource related to the PSFCH based on whether decoding of a transport block received through the PSSCH succeeds and the SL HARQ feedback option, wherein the SL HARQ feedback option is determined to one of a first SL HARQ feedback option or a second SL HARQ feedback option.

According to an embodiment of the present disclosure, an apparatus (or chip (set)) controlling a first terminal may be provided. The apparatus may include: at least one processor and at least one computer memory operably connected by the at least one processor and storing instructions, wherein, by the at least one processor executing the instructions, the first terminal is configured to: receive a physical sidelink shared channel (PSSCH) from a second apparatus, determine a resource related to a physical sidelink feedback channel (PSFCH) based on a resource related to the PSSCH, determine an SL HARQ feedback option based on link quality between the first apparatus and the second apparatus, and transmit SL HARQ feedback information for the PSSCH to the second apparatus through a resource related to the PSFCH based on whether decoding of a transport block received through the PSSCH succeeds and the SL HARQ feedback option, wherein the SL HARQ feedback option is determined to one of a first SL HARQ feedback option or a second SL HARQ feedback option.

In an example, the first terminal of the embodiment may refer to the first apparatus described in overall of the present disclosure. In an example, the at least one processor, the at least one memory, and the like in the apparatus controlling the first terminal may be implemented as a separate sub-chip, or at least two or more components may be implemented through one sub-chip.

According to an embodiment of the present disclosure, a non-transitory computer-readable storage medium storing instructions may be provided. Based on that the instructions are executed by the at least one processor of the non-transitory computer-readable storage medium: the first apparatus may receive a physical sidelink shared channel (PSSCH) from a second apparatus, the first apparatus may determine a resource related to a physical sidelink feedback channel (PSFCH) based on a resource related to the PSSCH, the first apparatus may determine an SL HARQ feedback option based on link quality between the first apparatus and the second apparatus, and the first apparatus may transmit SL HARQ feedback information for the PSSCH to the second apparatus through a resource related to the PSFCH based on whether decoding of a transport block received through the PSSCH succeeds and the SL HARQ feedback option, wherein the SL HARQ feedback option is determined to one of a first SL HARQ feedback option or a second SL HARQ feedback option.

Figure 16:
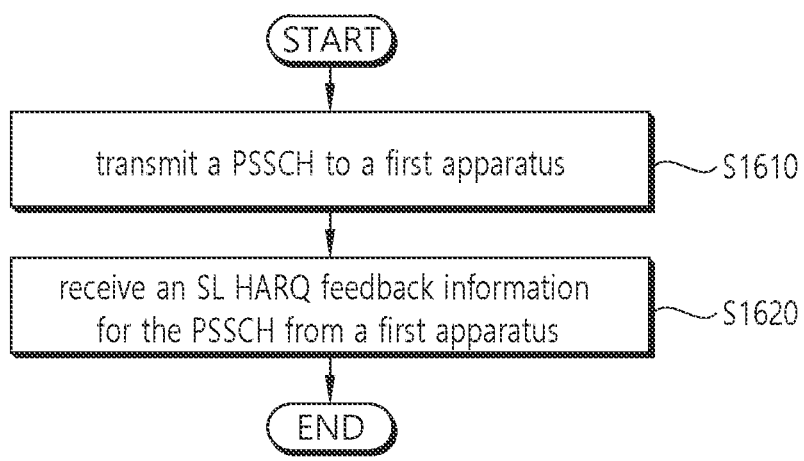
FIG. 16 is a flowchart illustrating an operation of a second apparatus according to an embodiment of the present disclosure.

FIG. 16 is a flowchart illustrating an operation of a second apparatus according to an embodiment of the present disclosure.

Operations disclosed in the flowchart of FIG. 16 may be performed in combination with various embodiments of the present disclosure. In one example, operations disclosed in the flowchart of FIG. 16 may be performed based on at least one of the apparatuses illustrated in FIGS. 17 to 22. In an example, the second apparatus of FIG. 16 may correspond to the second wireless device 200 of FIG. 18 to be described later. In another example, the second apparatus of FIG. 16 may correspond to the first wireless device 100 of FIG. 18 to be described later.

transmitting a physical sidelink shared channel (PSSCH) to a first apparatus; and receiving SL HARQ feedback information for the PSSCH from the first apparatus, wherein the SL HARQ feedback information is determined based on whether decoding of a transport block transmitted to the first apparatus through the PSSCH succeeds in the first apparatus and the SL HARQ feedback option, and wherein the SL HARQ feedback option is determined to one of a first SL HARQ feedback option or a second SL HARQ feedback option based on link quality between the first apparatus and the second apparatus.

In an embodiment, an HARQ-negative acknowledgement (NACK) based on unsuccessful decoding of the transport block may be included in the SL HARQ feedback information based on a determination that the SL HARQ feedback option is the first SL HARQ feedback option. In this case, an HARQ-acknowledgement (ACK) based on successful decoding of the transport block may not be transmitted to the second apparatus.

In an embodiment, either the HARQ-NACK or HARQ-ACK based on successful decoding of the transport block may be included in the SL HARQ feedback information based on a determination that the SL HARQ feedback option is the second SL HARQ feedback option. In addition, based on a determination that the SL HARQ feedback option is the second SL HARQ feedback option, the HARQ-NACK may be included in the SL HARQ feedback information and transmitted to the second apparatus when a decoding for the transport block fails.

In an embodiment, the link quality may be derived based on at least one of a distance between the first apparatus and the second apparatus, a reference signal received power (RSRP) value, a reference signal received quality (RSRQ) value or a reference signal strength indicator (RSSI) value derived based on the first apparatus and the second apparatus.

In an embodiment, for a channel estimation or channel state measurement, the first apparatus and/or the second apparatus may use a reference signal (RS) which is recognized by both the first apparatus and the second apparatus.

In an embodiment, the SL HARQ feedback option may be determined to the first SL HARQ feedback option based on a determination that the distance between the first apparatus and the second apparatus is less than a first threshold value. In addition, the SL HARQ feedback option may be determined to the second SL HARQ feedback option based on a determination that the distance between the first apparatus and the second apparatus is bigger than or equal to the first threshold value.

In an embodiment, the SL HARQ feedback option may be determined to the first SL HARQ feedback option based on a determination that the RSRP value is bigger than or equal to a second threshold value. In addition, the SL HARQ feedback option may be determined to the second SL HARQ feedback option based on a determination that the RSRP value is less than the second threshold value.

In an embodiment, the SL HARQ feedback option may be determined to the first SL HARQ feedback option based on a determination that the RSRQ value is bigger than or equal to a third threshold value. In addition, the SL HARQ feedback option may be determined to the second SL HARQ feedback option based on a determination that the RSRQ value is less than the third threshold value.

In an embodiment, the SL HARQ feedback option may be determined to the first SL HARQ feedback option based on a determination that the RSSI value is less than a fourth threshold value. In addition, the SL HARQ feedback option may be determined to the second SL HARQ feedback option based on a determination that the RSSI value is bigger than or equal to the fourth threshold value.

In an embodiment, the SL HARQ feedback option may be determined to either the first SL HARQ feedback option or the second SL HARQ feedback option based on the link quality and group information of a group receiving the PSSCH and the PSCCH transmitted from the second apparatus based on groupcast.

In an embodiment, the group information may include a total number of apparatuses included in the group. In other words, the total number of apparatuses included in the group may represent the number of group members in the group.

In an embodiment, the SL HARQ feedback option may be determined to the first SL HARQ feedback option based on a determination that the total number of the apparatuses included in the group is bigger than or equal to a fifth threshold value. In addition, the SL HARQ feedback option may be determined to the second HARQ feedback option based on a determination that the total number of the apparatuses included in the group is less than the fifth threshold value.

In an embodiment, the fifth threshold value may be derived based on threshold information about the total number of the apparatuses included in the group, received from the base station. The base station may be a gNB and/or an eNB, but examples of the base station are not limited to a gNB and/or an eNB. The threshold information on the total number of apparatuses may be referred to as threshold information on the number of group members. In one example, the threshold information for the total number of the apparatuses may be transmitted from the base station to the first apparatus and/or the second apparatus based on data information and/or control information. Alternatively, in one example, the fifth threshold value may be transmitted from an upper layer (e.g., an application layer) to a lower layer (e.g., a radio layer) of the first apparatus and/or the second apparatus. Each upper layer of the first apparatus and/or the second apparatus may receive the fifth threshold from the V2X server and transmit it to a lower layer. The first to fifth threshold values described in the above embodiments represent arbitrary threshold values, and some of the threshold values frequently used for each indicator (e.g., RSRP, RSSI, RSRP, distance, etc) in the art may be used as one of the first to fifth threshold values. In an example, the first to fifth threshold values may be derived based on information received from the base station. In another example, the first to fifth threshold values may be calculated by the first apparatus and/or the second apparatus.

According to an embodiment of the present disclosure, a second apparatus receiving sidelink hybrid automatic repeat request (SL HARQ) feedback information may be provided. The second apparatus may include: at least one memory storing instructions, at least one transceiver and at least one processor connecting the at least one memory and the at least one transceiver, wherein the at least one processor is configured to: control the at least one transceiver to transmit a physical sidelink shared channel (PSSCH) to a first apparatus, and control the at least one transceiver to receive SL HARQ feedback information for the PSSCH from the first apparatus, wherein the SL HARQ feedback information is determined based on whether decoding of a transport block transmitted to the first apparatus through the PSSCH succeeds in the first apparatus and the SL HARQ feedback option, and wherein the SL HARQ feedback option is determined to one of a first SL HARQ feedback option or a second SL HARQ feedback option based on link quality between the first apparatus and the second apparatus.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
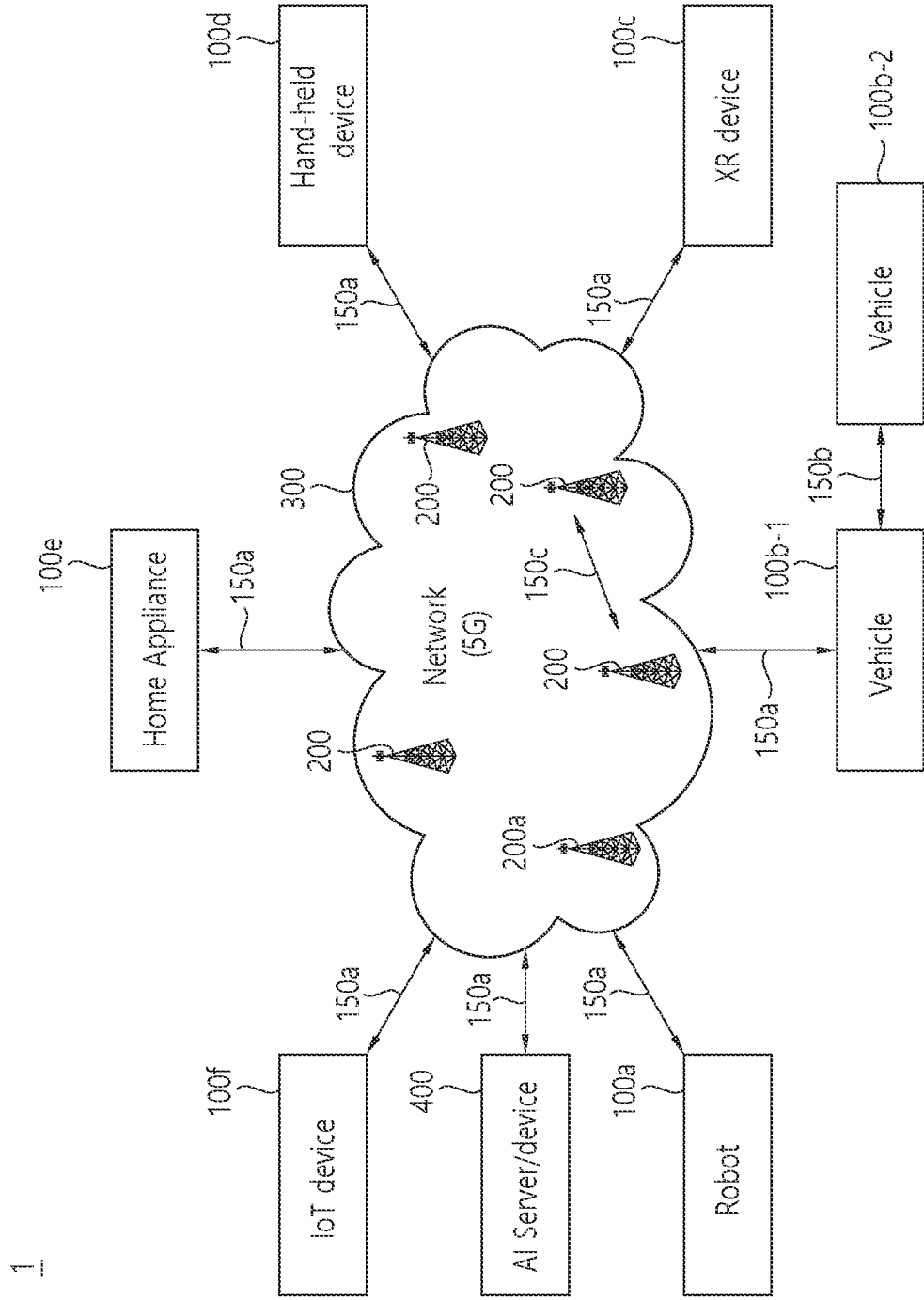
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
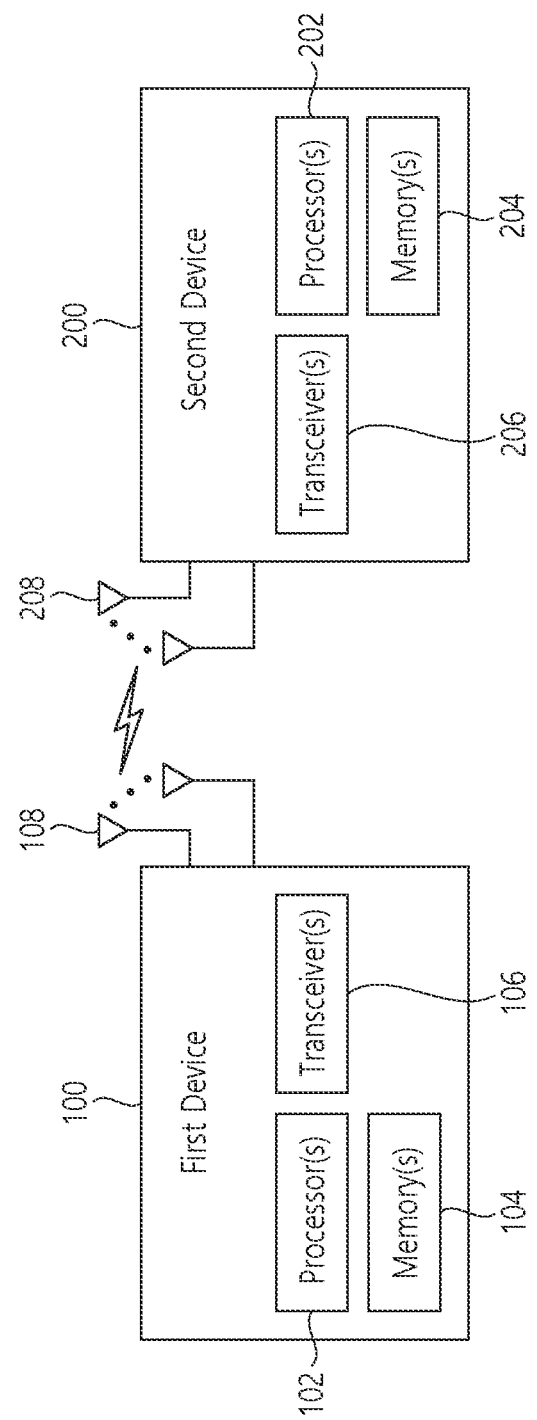
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
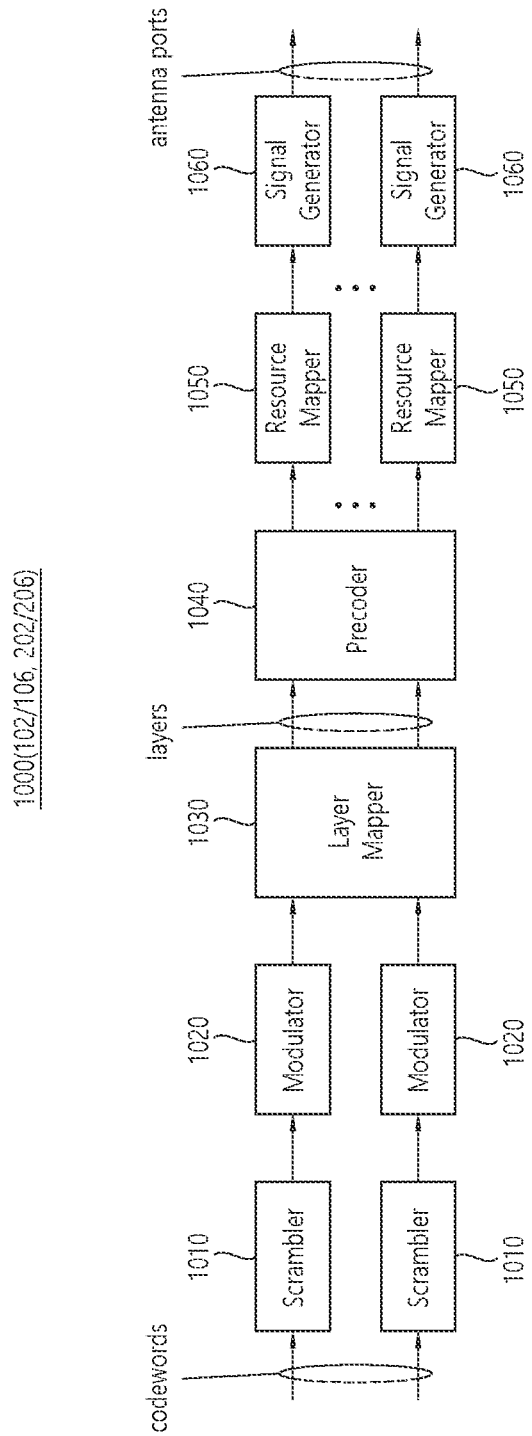
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed by, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
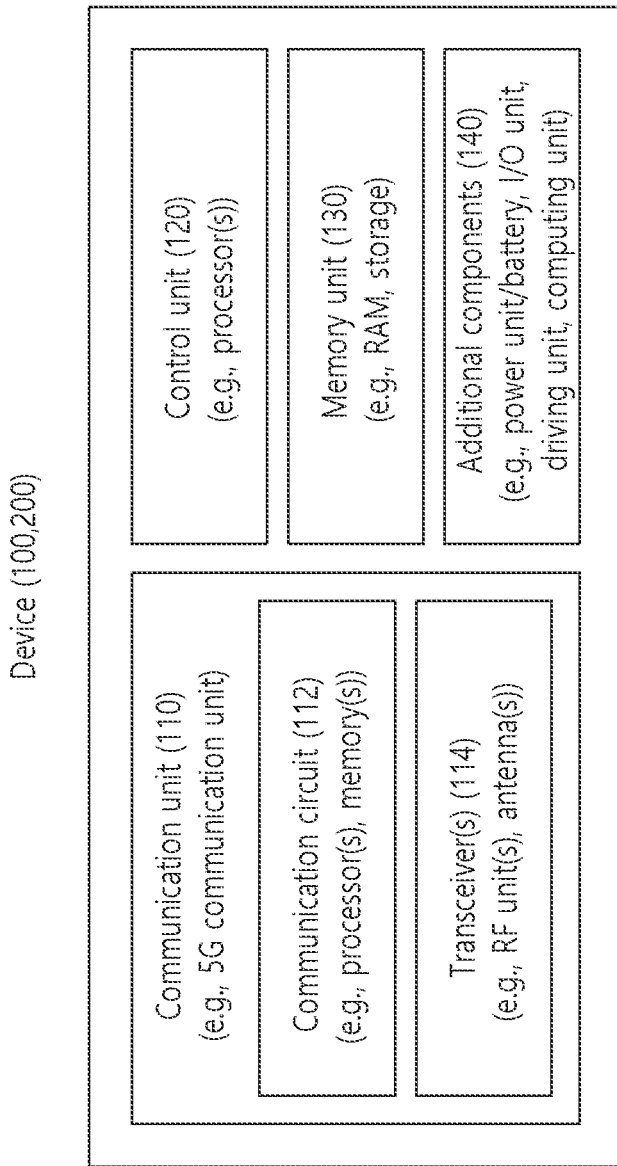
FIG. 20 shows a wireless device, in accordance with an embodiment of the present disclosure.

FIG. 20 shows a wireless device, in accordance with an embodiment of the present disclosure. The wireless device may be implemented in various forms according to a use-case/service (see FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
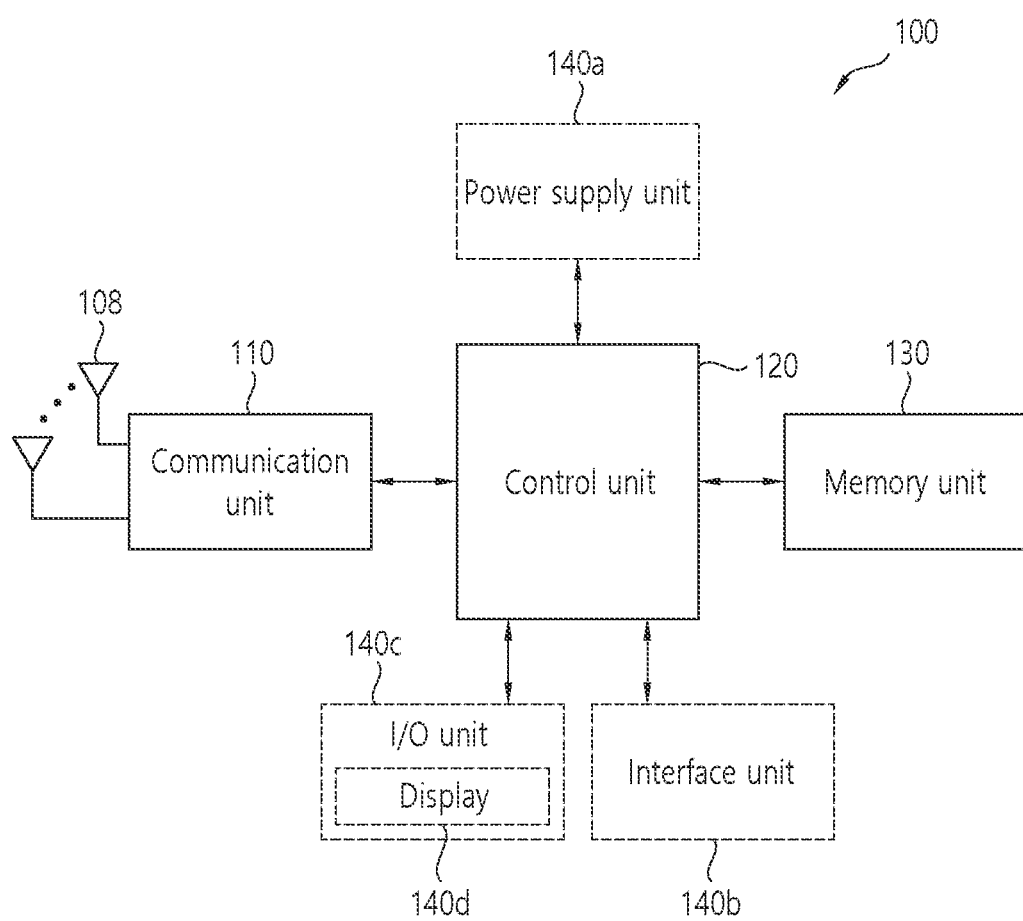
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
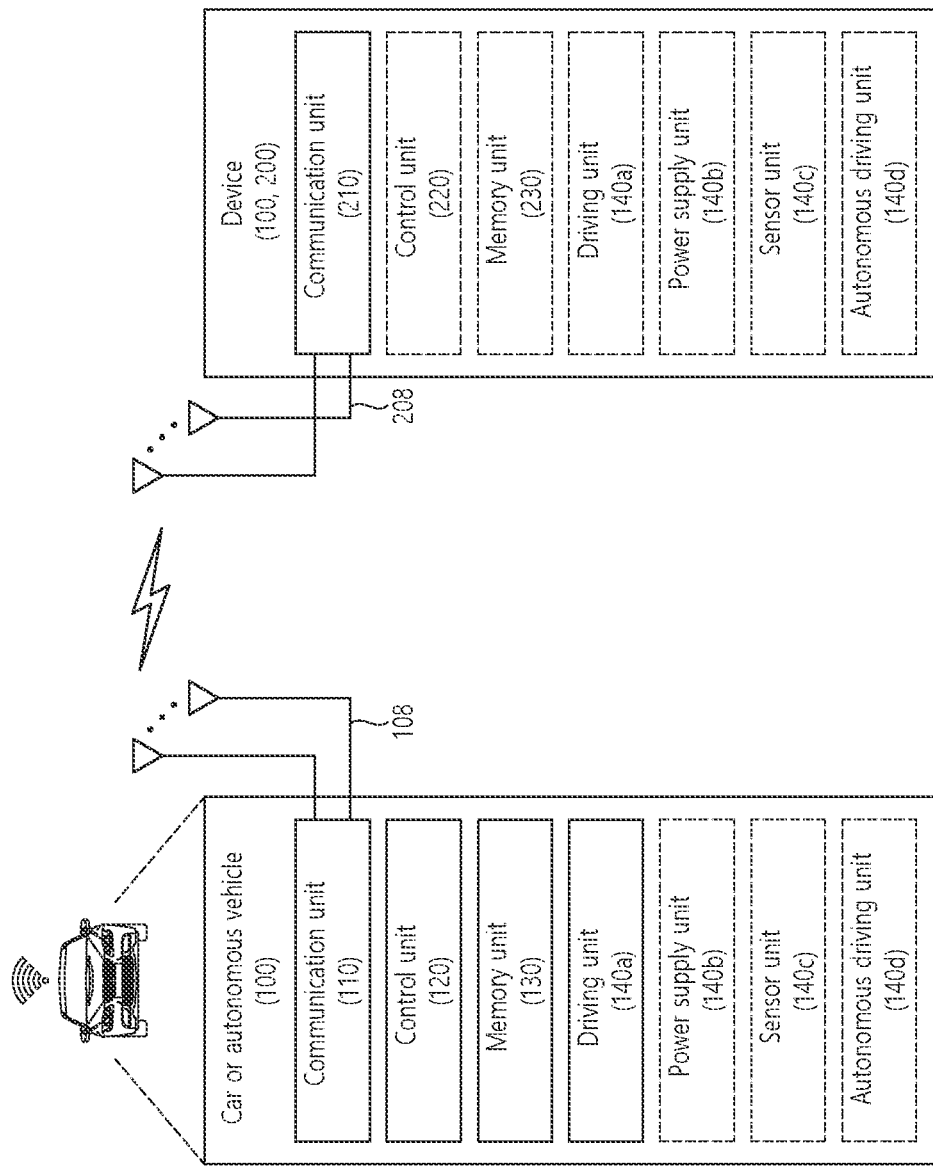
FIG. 22 shows a car or an autonomous vehicle, in accordance with an embodiment of the present disclosure.

FIG. 22 shows a car or an autonomous vehicle, in accordance with an embodiment of the present disclosure. The car or autonomous vehicle may be implemented by a mobile robot, a car, a train, a manned/unmanned Aerial Vehicle (AV), a ship, etc.

Referring to FIG. 22, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

The scope of the disclosure may be represented by the following claims, and it should be construed that all changes or modifications derived from the meaning and scope of the claims and their equivalents may be included in the scope of the disclosure.

What is claimed is:

1. A method for transmitting sidelink hybrid automatic repeat request (SL HARQ) feedback information by a first apparatus, the method including:
   receiving a physical sidelink shared channel (PSSCH) from a second apparatus;
   determining a resource related to a physical sidelink feedback channel (PSFCH) based on a resource related to the PSSCH;
   determining a SL HARQ feedback option based on link quality between the first apparatus and the second apparatus; and
   transmitting SL HARQ feedback information for the PSSCH through the resource related to the PSFCH based on (i) whether decoding of a transport block received through the PSSCH succeeds and (ii) the SL HARQ feedback option,
   wherein the link quality is derived based on a reference signal strength indicator (RSSI) value derived based on the first apparatus and the second apparatus,
   wherein based on a determination that the SL HARQ feedback option is a first SL HARQ feedback option: a HARQ-negative acknowledgement (NACK) based on unsuccessful decoding of the transport block is included in the SL HARQ feedback information,
   wherein based on a determination that the SL HARQ feedback option is a second SL HARQ feedback option: either the HARQ-NACK or HARQ-ACK based on successful decoding of the transport block is included in the SL HARQ feedback information,
   wherein the SL HARQ feedback option is determined to be the first SL HARQ feedback option, based on a determination that the RSSI value is less than a threshold value, and
   wherein the SL HARQ feedback option is determined to be the second SL HARQ feedback option, based on a determination that the RSSI value is greater than or equal to the threshold value.

2. A first apparatus transmitting sidelink hybrid automatic repeat request (SL HARQ) feedback information, the first apparatus including:
   at least one transceiver;
   at least one processor; and
   at least one memory connected to the at least one processor and storing instructions that, based on being executed, cause the at least one processor to perform operations comprising:
   receiving a physical sidelink shared channel (PSSCH) from a second apparatus;
   determining a resource related to a physical sidelink feedback channel (PSFCH) based on a resource related to the PSSCH;
   determining a SL HARQ feedback option based on link quality between the first apparatus and the second apparatus; and
   transmitting SL HARQ feedback information for the PSSCH through the resource related to the PSFCH based on whether decoding of a transport block received through the PSSCH succeeds and the SL HARQ feedback option,
   wherein the link quality is derived based on a reference signal strength indicator (RSSI) value derived based on the first apparatus and the second apparatus,
   wherein based on a determination that the SL HARQ feedback option is a first SL HARQ feedback option: a HARQ-negative acknowledgement (NACK) based on unsuccessful decoding of the transport block is included in the SL HARQ feedback information,
   wherein based on a determination that the SL HARQ feedback option is a second SL HARQ feedback option: either the HARQ-NACK or HARQ-ACK based on successful decoding of the transport block is included in the SL HARQ feedback information,
   wherein the SL HARQ feedback option is determined to be the first SL HARQ feedback option, based on a determination that the RSSI value is less than a threshold value, and
   wherein the SL HARQ feedback option is determined to be the second SL HARQ feedback option, based on a determination that the RSSI value is greater than or equal to the threshold value.

3. A processing device adapted to control a first apparatus transmitting sidelink hybrid automatic repeat request (SL HARQ) feedback information, the processing device comprising:
   at least one processor; and
   at least one memory connected to the at least one processor and storing instructions that, based on being executed, cause the at least one processor to perform operations comprising:
   receiving a physical sidelink shared channel (PSSCH) from a second apparatus;
   determining a resource related to a physical sidelink feedback channel (PSFCH) based on a resource related to the PSSCH;
   determining a SL HARQ feedback option based on link quality between the first apparatus and the second apparatus; and
   transmitting SL HARQ feedback information for the PSSCH through the resource related to the PSFCH based on whether decoding of a transport block received through the PSSCH succeeds and the SL HARQ feedback option, wherein the link quality is derived based on a reference signal strength indicator (RSSI) value derived based on the first apparatus and the second apparatus, wherein based on a determination that the SL HARQ feedback option is a first SL HARQ feedback option: a HARQ-negative acknowledgement (NACK) based on unsuccessful decoding of the transport block is included in the SL HARQ feedback information, wherein based on a determination that the SL HARQ feedback option is a second SL HARQ feedback option: either the HARQ-NACK or HARQ-ACK based on successful decoding of the transport block is included in the SL HARQ feedback information, wherein the SL HARQ feedback option is determined to be the first SL HARQ feedback option, based on a determination that the RSSI value is less than a threshold value, and wherein the SL HARQ feedback option is determined to be the second SL HARQ feedback option, based on a determination that the RSSI value is greater than or equal to the threshold value.

* * * * *